United States Patent
Roitshtein et al.

(10) Patent No.: US 9,819,637 B2
(45) Date of Patent: Nov. 14, 2017

(54) EFFICIENT LONGEST PREFIX MATCHING TECHNIQUES FOR NETWORK DEVICES

(71) Applicant: MARVELL WORLD TRADE LTD., St. Michael (BB)

(72) Inventors: Amir Roitshtein, Holon (IL); Gil Levy, Hod Hasharon (IL); Carmi Arad, Nofit (IL)

(73) Assignee: Marvell World Trade Ltd., St. Michael (BM)

(*) Notice: Subject to any disclaimer, the term of this patent is extended or adjusted under 35 U.S.C. 154(b) by 494 days.

(21) Appl. No.: 14/192,579

(22) Filed: Feb. 27, 2014

(65) Prior Publication Data
US 2014/0244779 A1 Aug. 28, 2014

Related U.S. Application Data

(60) Provisional application No. 61/859,053, filed on Jul. 26, 2013, provisional application No. 61/770,100, filed on Feb. 27, 2013.

(51) Int. Cl.
| | |
|---|---|
| *H04L 29/12* | (2006.01) |
| *H04L 12/745* | (2013.01) |
| *H04L 12/743* | (2013.01) |
| *G06F 15/167* | (2006.01) |
| *G06F 15/173* | (2006.01) |

(52) U.S. Cl.
CPC .......... *H04L 61/103* (2013.01); *H04L 45/748* (2013.01); *H04L 45/7453* (2013.01)

(58) Field of Classification Search
CPC . H04L 45/7457; H04L 61/103; H04L 45/748; H04L 45/7453; H04L 45/00
USPC .............. 709/213, 238; 370/392, 395.32
See application file for complete search history.

(56) References Cited

U.S. PATENT DOCUMENTS

| | | | |
|---|---|---|---|
| 5,032,987 A | 7/1991 | Broder et al. | |
| 6,035,107 A | 3/2000 | Kuehlmann et al. | |
| 6,067,574 A * | 5/2000 | Tzeng ............... | G06F 15/17337 707/999.101 |

(Continued)

OTHER PUBLICATIONS

Herlihy et al., "Hopscotch Hashing," *DISC'08 Proceedings of the 22nd International Symposium on Distributed Computing*, pp. 350-364 (Sep. 22, 2008).

(Continued)

*Primary Examiner* — David Lazaro
*Assistant Examiner* — Zi Ye

(57) ABSTRACT

A network address associated with a packet is obtained at a search engine of a network device. The search engine includes a plurality of Bloom filters that represent prefixes of respective lengths in the routing table. Respective Bloom filters are applied to respective prefixes of the network address to determine a set of one or more prefixes for which a match potentially exists in the routing table. A number of accesses to the memory are performed using prefixes in set of prefixes, beginning with a longest prefix and continuing in decreasing order of prefix lengths until a matching entry is found in the routing table, and routing information for the packet is retrieved. If the number of performed memory accesses exceeds a threshold, the routing table is adapted to reduce a number of memory accesses to be performed for subsequent packets associated with the network address.

24 Claims, 10 Drawing Sheets

(56) References Cited

U.S. PATENT DOCUMENTS

| | | | |
|---|---|---|---|
| 6,249,521 B1 | 6/2001 | Kerstein | |
| 6,363,396 B1 | 3/2002 | Klots et al. | |
| 6,430,170 B1 | 8/2002 | Saints et al. | |
| 6,614,758 B2 | 9/2003 | Wong et al. | |
| 6,735,670 B1 | 5/2004 | Bronstein et al. | |
| 6,973,082 B2 | 12/2005 | Devi et al. | |
| 7,190,696 B1 | 3/2007 | Manur et al. | |
| 7,280,527 B1 | 10/2007 | Basso et al. | |
| 7,346,706 B2 | 3/2008 | Rezaaifar et al. | |
| 7,398,278 B2* | 7/2008 | Cadambi | H04L 29/12801 |
| 7,539,750 B1 | 5/2009 | Parker et al. | |
| 7,554,914 B1 | 6/2009 | Li et al. | |
| 7,567,567 B2 | 7/2009 | Muller et al. | |
| 7,580,417 B2 | 8/2009 | Ervin et al. | |
| 7,613,209 B1 | 11/2009 | Nguyen et al. | |
| 7,623,455 B2 | 11/2009 | Hilla et al. | |
| 7,639,614 B2 | 12/2009 | Nakagawa et al. | |
| 7,796,594 B2 | 9/2010 | Melman et al. | |
| 7,821,925 B2 | 10/2010 | Davies | |
| 7,821,931 B2 | 10/2010 | Swenson et al. | |
| 7,898,959 B1 | 3/2011 | Arad | |
| 7,969,880 B2 | 6/2011 | Yano et al. | |
| 7,979,671 B2 | 7/2011 | Aviles | |
| 8,176,242 B1 | 5/2012 | Shamis et al. | |
| 8,238,250 B2 | 8/2012 | Fung | |
| 8,243,594 B1 | 8/2012 | Fotedar et al. | |
| 8,250,080 B1* | 8/2012 | Guha | 707/705 |
| 8,274,971 B2 | 9/2012 | Battle et al. | |
| 8,339,951 B2 | 12/2012 | Scaglione | |
| 8,355,328 B2 | 1/2013 | Matthews et al. | |
| 8,364,711 B2 | 1/2013 | Wilkins et al. | |
| 8,448,234 B2 | 5/2013 | Mondaeev et al. | |
| 8,503,456 B2 | 8/2013 | Matthews et al. | |
| 8,587,674 B2 | 11/2013 | Iwata | |
| 8,625,594 B2 | 1/2014 | Safrai et al. | |
| 8,756,424 B2 | 6/2014 | Roitshtein et al. | |
| 8,792,497 B2 | 7/2014 | Rajagopalan et al. | |
| 8,848,728 B1 | 9/2014 | Revah et al. | |
| 2002/0093952 A1 | 7/2002 | Gonda | |
| 2004/0073640 A1 | 4/2004 | Martin et al. | |
| 2006/0251109 A1 | 11/2006 | Muller et al. | |
| 2008/0037544 A1 | 2/2008 | Yano et al. | |
| 2008/0049774 A1 | 2/2008 | Swenson et al. | |
| 2008/0052488 A1 | 2/2008 | Fritz et al. | |
| 2008/0181103 A1 | 7/2008 | Davies | |
| 2008/0205655 A1 | 8/2008 | Wilkins et al. | |
| 2009/0196303 A1 | 8/2009 | Battle et al. | |
| 2010/0023726 A1 | 1/2010 | Aviles | |
| 2010/0023727 A1 | 1/2010 | Lim | |
| 2010/0040067 A1* | 2/2010 | Hao | H04L 45/00 370/395.32 |
| 2010/0098081 A1* | 4/2010 | Dharmapurikar | H04L 45/7457 370/392 |
| 2010/0284405 A1 | 11/2010 | Lim | |
| 2011/0013627 A1 | 1/2011 | Matthews et al. | |
| 2012/0136846 A1 | 5/2012 | Song et al. | |
| 2013/0219117 A1* | 8/2013 | Macko | G06F 12/123 711/112 |
| 2013/0246651 A1* | 9/2013 | Keen | H04L 45/7453 709/238 |
| 2014/0177470 A1 | 6/2014 | Roitshtein et al. | |
| 2014/0301394 A1 | 10/2014 | Arad et al. | |

OTHER PUBLICATIONS

"Hopscotch Hashing," Wikipedia entry downloaded from http://en.wikipedia.org/wiki/Hopscotch_hashing on Oct. 6, 2014 (3 pages).

Raoof et al., "Impact of Depolarization Effects on MIMO Polarized Wireless Configuration, Wireless Communications," Networking and Mobile Computing, 2007. (WiCom 2007), pp. 1-4 (Sep. 2007).

Shavit, "Hopscotch Hashing," PowerPoint Presentation downloaded from http://www.velox-project.eu/sites/default/files/Hopscotch%20Hashing%20talk%20slides.ppt on Oct. 6, 2014 (50 slides).

Thaler et al., "Multipath Issues in Unicast and Multicast Next-Hop Selection," The Internet Society, pp. 1-10 (2000).

IEEE Std 802.1Q, 2003 Edition, "IEEE Standards for Local and Metropolitan area networks—Virtual Bridged Local Area Networks," *The Institute of Electrical and Electronics Engineers, Inc.*, 327 pages. (May 7, 2003).

IEEE Std 802.1Q—2011 (Revision of IEEE Std.802.1Q—2005), "IEEE Standard for Local and Metropolitan Area Networks—Media Access Control (MAC) Bridges and Virtual Bridged Local Area Networks," *The Institute of Electrical and Electronics Engineers, Inc.*, 1,365 pages (Aug. 31, 2011).

IEEE P802.1aq/D4.6, Draft Amendment to IEEE Std 802.1Q—2011, "IEEE Draft Standard for Local and Metropolitan Area Networks—Media Access Control (MAC) Bridges and Virtual Bridged Local Area Networks—Amendment XX: Shortest Path Bridging," *The Institute of Electrical and Electronics Engineers, Inc.*, 363 pages (Feb. 10, 2012).

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).

U.S. Appl. No. 12/537,078, "Hash Computation for Network Switches," filed Aug. 6, 2009.

U.S. Appl. No. 13/115,670, "Methods and Apparatus for Handling Multicast Packets in an Audio Video Bridging (AVB) Network," filed May 25, 2011.

U.S. Appl. No. 61/695,520, "Efficient TCAM Architecture," filed Aug. 31, 2012.

International Preliminary Report on Patentability in International Application No. PCT/IB2014/000989, dated Sep. 11, 2015 (11 pages).

Arad, et al., "Exact Match Lookup in Network Switch Devices," U.S. Appl. No. 13/737,608, filed Jan. 9, 2013.

Demetriades, et al., "An Efficient Hardware-based Multi-hash Scheme for High Speed IP Lookup," *IEEE Symposium on High Performance Interconnects*, 8 pages (Aug. 2008).

Lambert, et al., "Bloom Filters wiht Variable Hash," U.S. Appl. No. 14/215,141, filed Mar. 17, 2014.

Pagh, et al., "Cuckoo hashing," *Journal of Algorithms*, vol. 51, pp. 122-144 (2004).

Peng, et al., "Content-Addressable memory (CAM) and its network applications," *International IC—Taipei Conference Proceedings*, 3 pages (May 2000).

Shumsky, et al., "Multithreaded Parallel Packet Processing in Network Devices," U.S. Appl. No. 14/092,521, filed Nov. 27, 2013.

International Search Report and Written Opinion in International Application No. PCT/IB2014/00989, dated Dec. 3, 2014 (15 pages).

Invitation to Pay Additional Fees and Partial International Search Report for corresponding PCT Application No. PCT/IB2014/000989, dated Aug. 21, 2014 (7 pages).

Lim et al., "On Adding Bloom Filters to Longest Prefix Matching Algorithms," IEEE Trans. on Computers, vol. 63, No. 2, Jan. 2, 2014, made available online on Aug. 2012.

Li et al., "Fast Longest Prefix Name Lookup for Content-Centric Network Forwarding," Proc. of $8^{th}$ ACM/IEEE Symp. On Architectures for Networking and Communications Systems (ANCS '12), pp. 73-74, Oct. 29-30, 2012.

Le et al., "Scalable Tree-based Architectures for IPv4/v6 Lookup Using Prefix Partitioning," IEEE Transactions on Computers, pp. 1026-1039, Jul. 2012, made available online on Jul. 2011.

Kanizo et al., "Access-Efficient Balanced Bloom Filters", Technical Report TR11-07, Comnet, Technion, Israel (2011).

Dharmapurikar et al, "Fast Packet Classification Using Bloom Filters," ACM/IEEE Symposium on Architecture for Networking and Communications Systems 2006 (ANCS 2006), Dec. 2006.

Valimaki, "Least Random Suffix/Prefix Matches in Output-Sensitive Time," Proceedings of 23rd Annual Symposium (CPM 2012), Helsinki, Finland, pp. 269-279, Jul. 3-5, 2012.

Lim et al., "Survey and Proposal on Binary Search Algorithms for Longest Prefix Match," IEEE Communications Surveys & Tutorials, vol. 14, No. 3, pp. 681-697, Jul. 2012, made available online on Jun. 2011.

(56) References Cited

OTHER PUBLICATIONS

Zec et al., "DXR: Towards a Billion Routing Lookups per Second in Software," ACM SIGCOMM Computer Communication Review, vol. 42, No. 5, pp. 30-36, Oct. 2012.
Yu et al, "Gigabit Rate Packet Pattern-Matching Using TCAM," Computer Science Division, University of California, Report No. UCB/CSD-4-1341, Jul. 2004.
Dharmapurikar et al., "Fast and Scalable Pattern Matching for Network Intrusion Detection Systems," IEEE Journal on Selected Areas in Communications, vol. 24, No. 10, pp. 1781-1792, Oct. 2006.
Bando et al., "Flash Trie: Beyond 100-Gb/s IP Route Lookup Using Hash-Based Prefix-Compressed Trie", IEEE/ACM Transactions on Networking, vo. 20, No. 4, pp. 1262-1275, Aug. 14, 2012, made available online on Mar. 14, 2012.
Rottenstreich et al., "The Bloom Paradox: When Not to Use a Bloom Filter?", Proceedings of INFOCOM (2012), pp. 1638-1646, Mar. 25-30, 2012.
Dharmapurikar et al, "Longest Prefix Matching Using Bloom Filters," IEEE/ACM Transactions on Networking, vol. 14, No. 2, pp. 397-409, Apr. 2006.
Sailhan et al., "Folding and Unfolding Bloom Filters—An Off-Line Planning and On-Line Optimization", IEEE International Conference on Green Computing and Communications (GreenCom) 2012, pp. 34-41, Nov. 20-23, 2012.

* cited by examiner

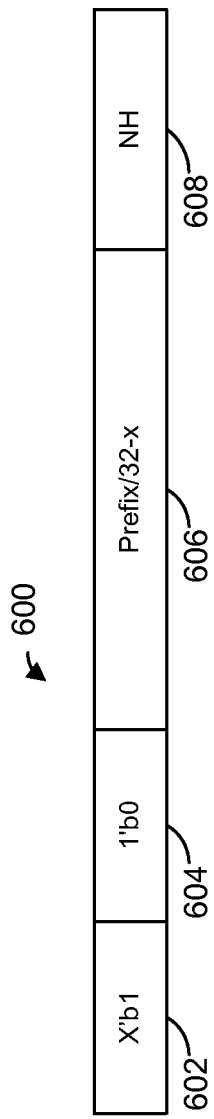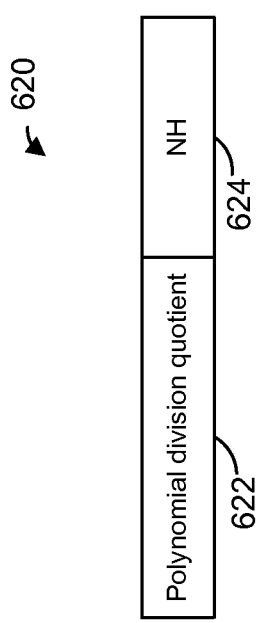
FIG. 6A
FIG. 6B

| Prefix/X | NH0/X+4 | NH1/X+4 | NH2/X+4 | ... | NH15/X+4 |
|---|---|---|---|---|---|
| 632 | 634-1 | 634-2 | 634-3 | | 634-16 |

| Prefix1/X1 | NH | Prefix1/X2 | NH | ... | PrefixN/XN | NH |
|---|---|---|---|---|---|---|
| 642-1 | 644-1 | 642-2 | 644-2 | | 642-N | 644-N |

EFFICIENT LONGEST PREFIX MATCHING TECHNIQUES FOR NETWORK DEVICES

CROSS-REFERENCES TO RELATED APPLICATION

This disclosure claims the benefit of U.S. Provisional Patent Application Nos. 61/770,100, filed Feb. 27, 2013, and 61/859,053, filed Jul. 26, 2013, both entitled "Longest Prefix Match," the disclosures of which are hereby expressly incorporated herein by reference in their entireties.

FIELD OF TECHNOLOGY

The present disclosure relates generally to network devices such as switches, routers, and edge devices, and more particularly to systems and methods for longest prefix match operations in such devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Network devices, such as network switches, bridges, routers, etc., typically perform longest prefix match lookups for routing packets that traverse a network device. Generally speaking, a routing table associates network addresses with next hops to which packets associated the network addresses should be transmitted from a network device. A longest prefix match lookup involves searching a routing table based on a network address associated with a packet to find a routing entry that matches the largest number of leading bits of the address. Some network devices use Ternary Content Addressable Memory (TCAM) technology-based routing tables. In a TCAM-based routing table, all entries of the routing table can be searched in parallel based on an address to find an entry having a longest prefix match for the address. Therefore, TCAM devices allow longest prefix match searches to be performed relatively quickly. However, TCAM devices are generally expensive in terms of size, cost and power consumption.

As an alternative to TCAM implementations, some network devices use random access memory devices, such as static random access memory (SRAM) devices or dynamic random access memory (DRAM) devices, for storing routing tables, and employ searching algorithms, such as trie-based algorithms to perform longest prefix match searches in the routing table. However, a RAM-based routing table typically requires more memory space and a higher memory bandwidth compared to a TCAM-based routing table of comparable size. Also, the searching algorithms typically employed to search such RAM-based routing tables are relatively slow and do not necessarily operate at high line rates supported by many network devices. Moreover, such RAM-based routing tables and searching algorithms do not scale well to readily handle the increasing length network addresses.

SUMMARY OF THE DISCLOSURE

In an embodiment, a method for performing longest prefix match lookup operations in a memory storing a routing table used for forwarding packets in a network device includes obtaining, at a search engine of the network device, a network address associated with a packet. The search engine includes a plurality of Bloom filters, wherein each of at least some of the Bloom filters represents prefixes of a certain length in the routing table. The method also includes applying, by the search engine of the network device, respective Bloom filters of the plurality of Bloom filters to respective prefixes of the network address to determine a set of one or more prefixes, of the network address, for which a match potentially exists in the routing table. The method additionally includes performing, by the search engine, a number of accesses to the memory using prefixes in set of prefixes, beginning with a longest prefix in the set of prefixes and continuing in decreasing order of prefix length in the set of prefixes until an entry having a matching prefix is found in the routing table. The method further includes retrieving, from the entry in the routing table, routing information for the packet. The method further still includes determining, by the search engine, that the number of performed memory accesses exceeds a threshold, and in response to determining that the number of performed memory accesses exceeds the threshold, adapting the routing table to reduce a number of memory accesses to be performed for subsequent packets associated with the network address.

In other embodiments, the method further includes any combination of one or more of the following features.

A first Bloom filter of the plurality of Bloom filters represent prefixes of a first length in the routing table.

The first Bloom filter includes a first Bloom filter block that represents a first subset of prefixes of the first length in the routing table; and a second Bloom filter block that represents a second subset of prefixes of the first length in the routing table.

The first subset of prefixes does not overlap with the second subset of prefixes.

Applying the first Bloom filter to a prefix includes calculating a hash value based on the prefix, using a first portion of the hash value to select the first Bloom filter block or the second Bloom filter block, using a second portion of the hash value to select a location in the selected one of the first Bloom filter block and the second Bloom filter block; and determining whether a match in the routing table potentially exists in the routing table based on the location.

Adapting the routing table comprises inserting a new entry into the routing table, wherein the new entry includes (i) is a prefix of the address, wherein the prefix is longer than the matching prefix associated with entry found in the routing table and (ii) the routing information retrieved from the entry found in the routing table.

Adapting the routing table is performed in a data plane of the network device.

In another embodiment, an apparatus comprises a memory for storing a routing table used for forwarding packets in a network device. The apparatus also comprises a search engine comprising a plurality of bloom filters configured to represent respective sets of prefixes of particular lengths in the routing table. The search engine is configured to obtain a network address associated with a packet and apply respective Bloom filters of the plurality of Bloom filters to respective prefixes of the network address to determine a set of one or more prefixes, of the network address, for which a match potentially exists in the routing table. The search engine is also configured to perform a number of accesses to the memory using prefixes in set of prefixes, beginning with a longest prefix in the set of prefixes and continuing in decreasing order of prefix length in the set of prefixes until an entry having a matching prefix is found in the routing table. The search engine is further configured to retrieve, from the matching entry in the routing table, routing information for the packet. The search engine is additionally configured to determine that the number of performed memory accesses exceeds a threshold, and in response to determining that the number of performed memory accesses exceeds the threshold, adapt the routing table in the memory to reduce number of memory accesses to be performed for subsequent packets associated with the network address.

In other embodiments, the apparatus further comprises any combination of one or more of the following features.

A first Bloom filter of the plurality of Bloom filters is configured to represent prefixes of a first length in the routing table.

The first Bloom filter includes a first Bloom filter block that represents a first subset of prefixes of the first length in the routing table; and a second Bloom filter block that represents a second subset of prefixes of the first length in the routing table.

The first subset of prefixes does not overlap with the second subset of prefixes.

The search engine further comprises a hash function engine configured to calculate a hash value based on a prefix of the first length.

The search engine is further configured to use a first portion of the hash value to select the first Bloom filter block or the second Bloom filter block; and use a second portion of the hash value to select a location in the selected one of the first Bloom filter block and the second Bloom filter block; and determine whether a match in the routing table potentially exists in the routing table based on the location.

The search engine is configured to adapt the routing table at least by inserting a new entry into the routing table, the new entry (i) is associated with a prefix of the address, wherein the prefix is longer than the longest prefix match found in the memory and (ii) includes the routing information retrieved from the memory.

Adapting the routing table is performed in a data plane of the network device.

In yet another embodiment, a method includes configuring, at a search engine of a network device, a Bloom filter having at least one Bloom filter block to represent a set of prefixes of a certain length in a routing table. The method also includes dynamically adjusting, using the search engine of the network device, a size of the Bloom filter. Dynamically adjusting the size of the Bloom filter includes determining, based on one or more factors associated with the Bloom filter, that one of (i) the size of the Bloom filter should be increased or (ii) the size of the Bloom filter should be decreased; and in response to determining that the size of the particular Bloom filter should be increased, adding one or more additional Bloom filter blocks to the Bloom filter; and in response to determining that the size of the particular Bloom filter should be decreased, removing one or more Bloom filter blocks from the Bloom filter.

In other embodiments, the method further includes any combination of one or more of the following features.

Adding one or more additional Bloom filter blocks to the Bloom filter comprises adding the one or more additional Bloom filter blocks without interrupting operation of the Bloom filter.

Determining, based on one or more factors associated with the Bloom filter, that one of (i) the size of the Bloom filter should be increased or (ii) the size of the Bloom filter should be decreased comprises determining a false positive probability for the Bloom filter; and determining that the size of the Bloom filter should be increased when the false positive probability exceeds a first threshold; and determining that the size of the Bloom filter should be decreased when the false positive probability falls below a second threshold.

The Bloom filter includes a first Bloom filter block and wherein adding one or more additional Bloom filter blocks to the Bloom filter comprises adding a second Bloom filter block to the Bloom filter; and configuring the first Bloom filter block to represent a first subset of the set of prefixes in the routing table represented by the Bloom filter and configuring the second Bloom filter block to represent a second subset of prefixes in the set of prefixes represented by the Bloom filter.

Configuring the first Bloom filter block to represent the first subset of the set of prefixes in the routing table represented by the Bloom filter and configuring the second Bloom filter block to represent a second subset of prefixes in the set of prefixes represented by the Bloom filter comprises copying contents of the first Bloom filter block to the second Bloom filter block, calculating a respective hash value for each of the prefixes in the set of prefixes, the hash value having a first portion and a second portion, using a first portion of the hash value calculated for a prefix to determine to which whether the prefix belongs to the first subset of the set of prefixes or to the second subset of the set of prefixes, and if it is determined that the prefix belongs to the first subset, setting a location, in the second Bloom filter block, to a value that indicates that the prefix does not belong to the second subset, wherein the location is indicated by the second portion of the hash value; and if it is determined that the prefix belongs to the second subset, setting a location, in the first Bloom filter block, to a value that indicates that the prefix does not belong to the first subset, wherein the location is indicated by the second portion of the hash value.

The Bloom filter includes a first Bloom filter block that represents a first subset of the set of prefixes represented by the Bloom filter and a second Bloom filter block that represents a second subset of prefixes represented by the Bloom filter.

Removing one or more Bloom filter blocks from the particular Bloom filter includes performing a logic OR operation based on contents of the first Bloom filter block and contents of the second Bloom filter block, configuring the first Bloom filter block based on the logic OR operation; and removing the second Bloom filter block.

Storing, in the routing table, prefixes, of the set of prefixes, in a compressed form, and wherein calculating the respective hash value for each of the prefixes comprises calculating the respective value based on a corresponding prefix compressed according to the compressed form.

In still another embodiment, an apparatus comprises a memory for storing a routing table used for forwarding packets in a network device. The apparatus also comprises a search engine that includes a plurality of Bloom filters configured to represent respective sets of prefixes of respective lengths in the routing table including a first Bloom filter having at least one Bloom filter block configured to represent the set of prefixes represented by the particular Bloom filter. The search engine also includes a dynamic bloom filter controller configured to determine, based on one or more factors associated with the first Bloom filter, that one of (i) the size of the first Bloom filter should be increased or (ii) the size of the first Bloom filter should be decreased; and in response to determining that the size of the first Bloom filter should be increased, add one or more additional Bloom filter blocks to the first Bloom filter; and in response to determining that the size of the first Bloom filter should be decreased, remove one or more Bloom filter blocks from the first Bloom filter.

In other embodiments, the apparatus further comprises any combination of one or more of the following features.

The dynamic Bloom filter is configured to add the one or more additional Bloom filter blocks to the Bloom filter without interrupting operation of the Bloom filter.

The dynamic Bloom filter controller is further configured to determine a false positive probability for the first Bloom filter, and determine that the size of the first Bloom filter should be increased when the false positive probability exceeds a first threshold, and determine that the size of the first Bloom filter should be decreased when the false positive probability falls below a second threshold.

The first Bloom filter includes a first Bloom filter block and wherein the dynamic Bloom filter controller is configured to, in response to determining that the size of the Bloom filter should be increased add a second Bloom filter block to the first Bloom filter, configure the first Bloom filter block to represent a first subset of the set of prefixes in the routing table represented by the first Bloom filter, and configure the second Bloom filter block to represent a second subset of prefixes in the set of prefixes represented by the first Bloom filter.

The dynamic Bloom filter controller is further configured to copy contents of the first Bloom filter block to the second Bloom filter block, obtain a respective hash value for each of the prefixes in the set of prefixes, the hash value having a first portion and a second portion, use a first portion of the hash value calculated for a prefix to determine to which whether the prefix belongs to the first subset of the set of prefixes or to the second subset of the set of prefixes, and if it is determined that the prefix belongs to the first subset, set a location, in the second Bloom filter block, to a value that indicates that the prefix does not belong to the second subset, wherein the location is indicated by the second portion of the hash value, and if it is determined that the prefix belongs to the second subset, set a location, in the first Bloom filter block, to a value that indicates that the prefix does not belong to the first subset, wherein the location is indicated by the second portion of the hash value.

The first Bloom filter includes a first Bloom filter block that represents a first subset of the set of prefixes represented by the Bloom filter and a second Bloom filter block that represents a second subset of prefixes represented by the Bloom filter The dynamic Bloom filter controller is configured to, in response to determining that the size of the first Bloom filter should be decreased obtain results of a logic OR operation performed based on contents of the first Bloom filter block and contents of the second Bloom filter block, configure the first Bloom filter block based on the logic OR operation; and remove the second Bloom filter block.

The memory is configured to store prefixes, of the set of prefixes, in a compressed form, The respective hash value for each of the prefixes is calculated based on a corresponding prefix compressed according to the compressed form.

BRIEF DESCRIPTION OF THE DRAWINGS

FIGS. 6A-6D are diagrams of example compressed entry formats used in a routing table, according to some embodiments;

DETAILED DESCRIPTION

Figure 1:
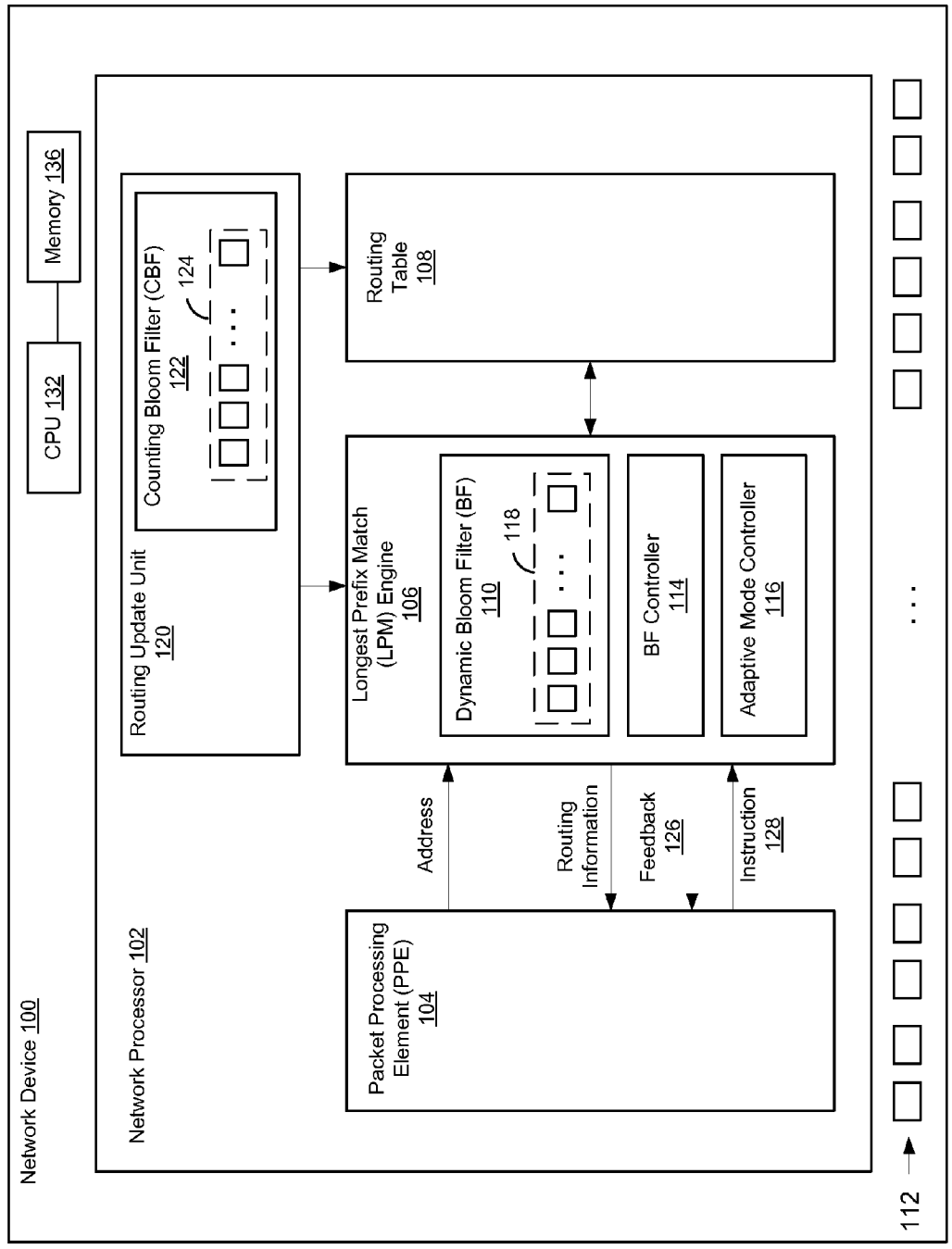
FIG. 1 is a simplified block diagram of an example network device configured to utilize longest prefix matching techniques of the present disclosure, according to an embodiment.

FIG. 1 is a simplified block diagram of an example network device 100 configured to utilize longest prefix matching techniques of the present disclosure, according to an embodiment. The network device 100 is generally a computer networking device that connects two or more computer systems, network segments, subnets, and so on. For example, the network device 100 is a router, in one embodiment. It is noted, however, that the network device 100 is not necessarily limited to a particular protocol layer or to a particular networking technology (e.g., Ethernet). For instance, in other embodiments, the network device 100 is a bridge, a switch, a VPN concentrator, etc.

The network device 100 includes a packet processor (or other suitable network processor) 102, and the network processor 102, in turn, includes a packet processing element (PPE), or packet processing node (PPN), 104 coupled to a processing engine 106. Although, for simplicity, only one PPE 104 and only one processing engine 106 are illustrated in FIG. 1, the network processor 102 includes other suitable numbers (e.g., 2, 3, 4, 5, etc.) of PPEs 104 and/or processing engines 106, in some embodiments. The PPEs 104 and the processing engines 106 are arranged in any suitable parallel or pipelined arrangements, in such embodiments. For example, in a parallel processing arrangement, the PPE 104 is one of a plurality of PPEs included in the packet processor 102 that are configured to perform, in parallel, processing operations on respective packets received by the network device 100, according to an embodiment. The processing engine 106 is one of a plurality of dedicated processing engines external to the packet processing elements 104 and dedicated to performing certain, for example computationally intensive, processing operations for the packets being processed by the packet processing elements 104, according to an embodiment. For example, the plurality of PPEs 104 are configured to process packets using computer readable instructions stored in a non-transitory memory (not shown), and the processing engines 106 are implemented using one or more application-specific integrated circuits (ASICs) or other hardware components, in an embodiment. Several example parallel packet processing arrangements used in some embodiments are described in U.S. patent application Ser. No. 14/092,521, filed on Nov. 27, 2013, which is incorporated by reference herein in its entirety. Several example parallel packet processing arrangements used in some embodiments are also described in U.S. patent application Ser. No. 14/137,571, filed on Dec. 20, 2013, which is incorporated by reference herein in its entirety.

As another example, in a serial packet processing architecture, the PPE 104 is one of a plurality of PPEs arranged in a serial, pipeline arrangement, wherein each PPE 104 is configured to perform one or several packet processing operations on a packet and pass the packet to the next PPE for further processing of the packet, according to an embodiment. For example, the PPEs 104 are configured to serially process a packet based on a packet context associated with the packet, in some such embodiments, and to selectively engage the processing engines 106 for performing certain actions on the packets. As just another example, both the PPEs 104 and the processing engines 106 are implemented using ASICs or other hardware components and are configured in any suitable serial or parallel arrangement to perform certain processing operations on packets.

The network device 100 also includes a plurality of network ports 112 coupled to the network processor 102, and each of the network ports 112 is coupled via a respective communication link to a communication network and/or to another suitable network device within a communication network. Generally speaking, the packet processor 102 is configured to process packets received via ingress ports 112, to determine respective egress ports 112 via which the packets are to be transmitted, and to cause the packets to be transmitted via the determined egress ports 112. In some embodiments, the packet processor 102 processes packet descriptors associated with the packets rather than processing the packets themselves. A packet descriptor includes some information from the packet, such as some or all of the header information of the packet, and/or includes information generated for the packet by the network device 100, in an embodiment. In some embodiments, the packet descriptor includes other information as well such as an indicator of where the packet is stored in a memory associated with the network device 100. For ease of explanation, the term "packet" herein is used to refer to a packet itself or to a packet descriptor associated with the packet. Further, as used herein, the term "packet processing element (PPE)" and the term "packet processing node (PPN)" are used interchangeably to refer to processing units configured to perform packet processing operations on packets received by the network device 100.

In an embodiment, the processing engine 106 is a search engine configured to perform longest prefix match lookups for packets based on addresses associated with the packets. The external engine 106 is sometimes referred to herein as "an LPM engine" 106. The search engine 106 is coupled to a routing table or database 108. In an embodiment, the routing table 108 stores associations between network addresses and next hops to which the packets associated with the network addresses should be should be transmitted from the network device. In at least some embodiments, the routing table 108 stores additional information, such as interfaces (e.g., ports 112) of the network device 100 used to transmit the packet to the next hops. The search engine 106 is configured to obtain an address, such as an IP address (e.g., a 32-bit IPv4 address or a 128-bit IPv6 address) from a header of the packet, and to perform a lookup in the routing table 108 based on the address to find, in the routing table 108, an entry having a longest matching prefix of the address. According to an embodiment, if a matching entry is found in the routing table 108, the search engine 106 retrieves routing information from the matching entry in the routing table 108 and provides the routing information to the PPE 104. The PPE 104 uses the routing information to make a forwarding decision with respect to the packet, such as to determine to which port 112 the packet should be forwarded for transmission of the packet, in an embodiment.

In an embodiment, the routing table 108 is stored in a memory external to the processing engine 106. In another embodiment, the routing table 108 is stored in a memory internal to the processing engine 106. In an embodiment, the routing table 108 is stored in a random access memory, such as a dynamic random access memory (DRAM) or a static random access memory (SRAM), for example. The routing table 108 is structured in any suitable manner, and lookups in the routing table 108 are performed using any suitable searching techniques, in various embodiments. Some example techniques for performing a lookup, used in some embodiments to perform lookups in the routing table 108, are described in U.S. patent application Ser. No. 13/737,608, filed on Jan. 9, 2013, which is incorporated by reference herein in its entirety.

The search engine 106 includes a dynamic Bloom filter system 110, a Bloom filter controller 114 and an adaptive mode controller 116, in an embodiment. The dynamic Bloom filter system 110 includes a set of Bloom filters 118. In an embodiment, each of at least some of the Bloom filters 118 is associated with a particular prefix length in the routing table 108. In an embodiment, all or substantially all of the Bloom filters 118 are associated with prefixes of particular lengths in the routing table 108. In another embodiment, some but not all of the Bloom filters 118 are associated with prefixes of particular lengths in the routing table 108, and the remaining Bloom filters 118 are Bloom filter blocks available for dynamically adjusting sizes of Bloom filters 118, as will be explained in more detail bellow, in at least some embodiments. In an embodiment, a Bloom filter 118 associated with a particular prefix length is configured to receive a prefix of the particular length and to provide an indication of whether (i) the prefix potentially has a match in the routing table 108 or (ii) the prefix definitely does not have a match in the routing table 108. To this end, Bloom filters 118 are "programmed" to represent sets of prefixes of particular lengths stored in the routing table 108, in an embodiment. When the search engine 106 receives an address, the search engine 106 performs parallel queries to Bloom filters 118 using respective prefixes of the address, and obtains respective positive or negative indications for the respective prefixes of the address. A negative indication for a prefix indicates that the prefix definitely does not have a match in the routing table 108, in an embodiment. On the other hand, a positive indication for a prefix indicates that the prefix potentially, but not definitely, has a match in the routing table 108, in an embodiment. That is, in this embodiment, a positive indication for a prefix may be a false positive indication, in some situations, and the search engine 106 performs one or more memory accesses to the routing table 108 to eliminate such false positive indications obtained from the Bloom filter system 200, in some embodiments and scenarios.

In an embodiment, the search engine 106 performs a lookup in the routing table 108 by accessing the routing table 108 using the prefixes indicated as potentially having matches in the routing table 108. A lookup operation begins with a longest prefix indicated as potentially having a match in the routing table 108 and, if necessary, continues with successively shorter prefixes indicated as potentially having matches in the routing table 108 until either (i) a match is found in the routing table 108 or (ii) all prefixes indicated as potentially having matches are exhausted and no match is found in the routing table 108, in an embodiment. According to an embodiment, the Bloom filter system 110 generally produces relatively few false positive indications for most or substantially all addresses, thereby ensuring that at most relatively few memory accesses need to be performed by the search engine 106 during lookup operations based on the addresses and reducing latency introduced by the search engine 106 by performing the lookup operations compared to search engine implementations that do not utilize Bloom filters, such as trie-based algorithmic search implementations, in various embodiments and/or scenarios. In at least some embodiments, however, for some addresses, the Bloom filter system 110 produces relatively high numbers of false positive indications, which potentially leads to high numbers of memory accesses performed by the search engine 106 during lookup operations based on such addresses potentially resulting in a higher latency introduced by the search engine 106 compared to implementations that do not utilize Bloom filters, such as trie-based algorithmic search implementations, in some embodiments and scenarios.

Generally speaking, false positive probability of a Bloom filter is positively correlated with the fill level of the Bloom filter and is negatively correlated with the size of the filter. Fill level of a Bloom filter generally depends on a number of prefixes of the length associated with the Bloom filter stored in the routing table 108. Due to uneven distribution of prefixes of various lengths in the routing table 108, some of the Bloom filters 118 represent larger sets of prefixes in the routing table 108 than other ones of the Bloom filter 118, in at least some embodiments and scenarios. In an embodiment, the Bloom filter controller 114 of the search engine 106 dynamically adjusts sizes of Bloom filters 118 to maintain suitable low false positive probability of respective Bloom filters 118 while efficiently utilizing resources, such as memory resources, available to the Bloom filter system 110. For example, the Bloom filter controller 114 monitors the Bloom filters 118 to determine when a particular Bloom filter 118 should be expanded, for example due to an increase in the number of prefixes in the set of represented by the Bloom filter 118, or, conversely, when a size of a particular Bloom filter 118 should be reduced, for example due to a reduction in the number of prefixes in the set of prefixes represented by the Bloom filter 118, according to an embodiment. For example, in an embodiment, the controller 114 stores or determines, for example based on statics collected for a Bloom filter 118 or for a set of Bloom filters 118, i) a first false positive probability threshold level used for determining that a size of a Bloom filter 118 should to be increased and ii) a second false positive probability threshold level used for determining that a size of a Bloom filter 118 should be decreased. The controller 114 determines that a size of a particular Bloom filter 118 should be increased when false positive probability associated with the particular Bloom filter 118 exceeds the first threshold level, and determines that a size of a particular Bloom filter 118 should be decreased when false positive probability associated with the particular Bloom filter 118 falls below the second threshold level, in an embodiment.

The controller 114 then acts accordingly to increase or, conversely, to decrease the size of the particular Bloom filter 118, in an embodiment. Increasing the size of a Bloom filter 118 reduces false positive probability of the Bloom filter 118, in at least some embodiments and scenarios. Reducing false positive probability reduces the number of accesses to the routing table 108 that the search engine 106 performs during a lookup operation for an address, in at least some situations. Because fewer memory accesses need to be performed during a lookup operation, latency introduced by search operations performed by the search engine 106 is also decreased, in at least some embodiments and/or scenarios. On the other hand, decreasing the size of a Bloom filter 118 allows memory resources of the system 110 to be efficiently utilized, in at least some embodiments and scenarios.

Some of the addresses provided to the Bloom filter system 110 result, in some embodiments, in relatively high numbers of false positive indications obtained from the Bloom filter system 110, even when sizes of the Bloom filters 118 are dynamically adjusted to generally maintain suitably low false positive probabilities for the Bloom filter 118. Lookups for such addressed involve potentially high numbers of memory accesses to the routing table 108, in some embodiments and/or scenarios. In an embodiment, the adaptive mode controller 116 of the search engine 106 is configured to detect such addresses for which a lookup in the routing table 108 required a high number of accesses to the routing table 108 and resulted in a match found in the routing table 108. In response to detecting such an address, the adaptive mode controller operates to adapt the routing table 108 to reduce the number of memory accesses to the routing table 108 that will need to be performed for subsequent lookups performed based on the address, in an embodiment. For example, when an address requiring a high number (e.g., exceeding a predetermined threshold) of memory accesses is detected by the adaptive mode controller 116, the adaptive mode controller 116 provides feedback 126 to the PPE 104 indicating to the PPE 104 that a high number of accesses to the routing table 108 was performed based on the network address. The PPE 104 then sends an instruction 128 to the search engine 106 instructing the search engine 106 to adapt the routing table 108 to reduce the number of accesses that the search engine 106 will need to perform during subsequent lookups based on the same network address, in an embodiment. An example system that implements adaptive mode according to an embodiment and an illustrative scenario is described in more detail below with respect to FIG. 5.

With continued reference to FIG. 1, a routing update unit 120, coupled to the routing table 108 and to the search engine 106, is configured to update the routing table 108 by inserting new entries into the routing table 108, such as when a new route associated with a prefix is learned by the network device 100, or, conversely, deleting an entry from the routing table 108, for example when the entry has not been accessed for a certain period of time, in an embodiment. In an embodiment, when the update unit 120 inserts a new entry associated with a prefix into the routing table 108, the update unit 120 provides the prefix to the search engine 106. The search engine 106 updates the Bloom filter system 110 to indicate that the prefix exists in the routing table 108. In particular, the Bloom filter 118 associated with the prefix length of the prefix is updated to provide a positive indication when queried with the prefix. Additionally, the routing update unit 120 increments a corresponding counter in the counting Bloom filter 122. Conversely, when an entry is deleted from the routing table 108, the update unit 120 decrements a corresponding counter 124 in the counting Bloom filter 122. Maintaining a counter 124 corresponding to a Bloom filter 118 allows the routing update unit 120 to subsequently update a corresponding Bloom filter 118 when all entries represented by a location of the Bloom filter 118 have been deleted from the routing table 108.

In some embodiments, the network device 100 includes a processor 132 that executes machine readable instructions stored in a memory device 136 included in, or coupled to, the processor 132. In some embodiments, the processor 132 comprises a central processing unit (CPU). In some embodiments, the processor 132 is coupled to the search engine 106 and to the routing table 108. The processor 132 performs functions associated with one or more of i) updating the routing table 108, ii) dynamically adjusting a size of a Bloom filter 118, and iii) adapting the routing table 108 based on feedback from the adaptive mode controller 114, in various embodiments. In an embodiment, a portion of the update unit 120 is implemented by the processor 132. In an embodiment, the entire update unit 120 is implemented by the processor 132. In some embodiments, the processor 132 does not perform any functions associated with update of the routing table 108.

Figure 2:
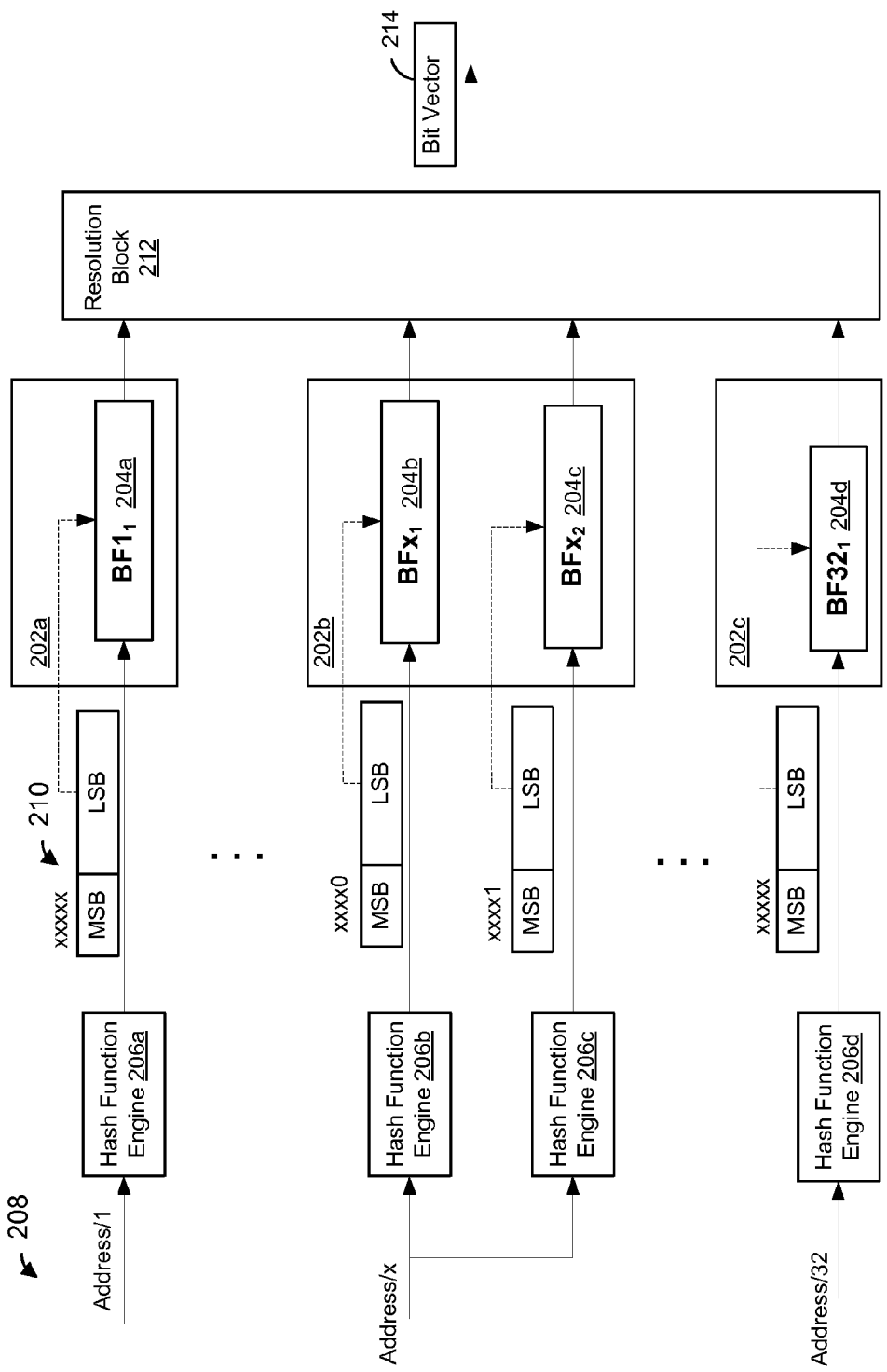
FIG. 2 is a block diagram of a an example Bloom filter system that is utilized as the Bloom filter system of the network device of FIG. 1, according to an embodiment.

FIG. 2 is a block diagram of an example Bloom filter system 200 that is utilized with the network device 100 of FIG. 1, according to an embodiment. For illustrative purposes, the example Bloom filter system 200 is discussed with reference to the network device 100 of FIG. 1. In other embodiments, however, the Bloom filter system 200 is utilized in a suitable network device different than the example network device 100 of FIG. 1. Similarly, the network device 100 of FIG. 1 utilizes a Bloom filter system other than the Bloom filter system 200, in some embodiments.

The Bloom filter system 200 includes a plurality of Bloom filters 202, each Bloom filter 202 associated with a set prefixes of a particular length stored in the routing table 108. In the example embodiment of FIG. 2, the system 200 includes 33. Bloom filter 202, each Bloom filter 202 associated with a respective prefix of a 32-bit IPv4 address. In other embodiments, the Bloom filter system 200 includes other suitable numbers (e.g., a suitable number less than 32 or a suitable number greater than 32) of Bloom filters 202. For example, in an embodiment in which the system 200 is configured to operate with 129-bit IPv6 addresses, the system 200 includes 129. Bloom filters 202 or a suitable number less than 129 Bloom filters 202, for example when not all of the possible prefixes of a 128-bit address are supported by the network device 100 (for example only 64 bits of a 128-bit address are used as a prefix for the address), in some embodiments. Alternatively, the Bloom filter system 200 includes a number of bloom filters that exceeds the number of prefix lengths supported by the network device 100, for example for dynamic expansion of the Bloom filter system 200 during operation of the network device 100, in some embodiments.

In an embodiment, the Bloom filter system 200 includes a plurality of Bloom filter blocks 204. Each of the Bloom filter blocks 204 is a separate random access memory (RAM) device, or is a respective portion of a RAM device, in an embodiment. Each Bloom filter 202 includes one or multiple ones of the Bloom filter blocks 204, in an embodiment. In the example embodiment and scenario illustrated in FIG. 2, the Bloom filter 202a includes a single Bloom filter block 204a, the Bloom filter 202b includes two Bloom filter blocks 204b and 204c, and the Bloom filter 202c comprises a single Bloom filter bock 202d. The number of Bloom filter blocks 204 in a Bloom filter 202 determines a size of the Bloom filter 202, in an embodiment. Thus, for example, a Bloom filter 202 that includes two Bloom filter blocks 204 is twice as long as a Bloom filter 202 that includes one Bloom filter block 202, in an embodiment. Similarly, a Bloom filter 202 that includes four Bloom filter blocks 204 is twice as long as a Bloom filter 202 that includes two Bloom filter blocks 204 and is four times as long as a Bloom filter 202 that includes one Bloom filter block 204, in an embodiments. The number of Bloom filter blocks 204 in a Bloom filter 202 generally determines a size of the Bloom filter 202, in an embodiment. In an embodiment, the number of Bloom filter blocks 204 in a Bloom filter 202 is dynamically adjusted during operation of the Bloom filter system 200. For example, a size of a Bloom filter 202 is increased to reduce the false positive probability of the Bloom filter 202, in an embodiment. Conversely, a size of a Bloom filter 202 is decreased, e.g., for example when the set of prefixes represented by the Bloom filter 202 is reduced, to make one or more Bloom filter blocks 204 associated with the Bloom filter 202 available for use with other Bloom filters 202, in an embodiment.

In an embodiment, the dynamic Bloom filter controller 114 (FIG. 1) is configured to dynamically adjust the number of Bloom filter blocks 204 in a Bloom filter 202 and, accordingly, the size of the Bloom filter 202, during operation of the Bloom filter system 200. For example, during operation of the Bloom filter system 200, the dynamic Bloom filter controller 114 detects that a particular Bloom filter 202 should be expanded, for example to maintain a suitably low false positive rate of the Bloom filter 202, in an embodiment. The controller 114 then operates to expand the size of the Bloom filter 202 by adding one or more additional Bloom filter blocks 204 to the Bloom filter 202 and reprogramming the Bloom filter 202 such that each of the Bloom filter blocks 204 included in the Bloom filter 202 represents a smaller subset of the set of prefixes represented by the Bloom filter 202, as will be explained in more detail below, in an embodiment. Conversely, the dynamic Bloom filter controller 114 detects that a certain Bloom filter 202 is too large for the number of prefixes of the corresponding length stored in the routing table 108, in an embodiment. In this case, the controller 114 operates to reduce the size of the Bloom filter 202 by removing one or more Bloom filter blocks 204, and reprogramming the remaining Bloom filter blocks 204 according to the set of prefixes represented by the Bloom filter 202, as will be described in more detail below, in an embodiment.

The Bloom filter system 200 includes a plurality of hash function engines 206 coupled to the plurality of Bloom filter blocks 204. In an embodiment, the hash function engines 206 are configured to receive respective prefixes 208 of a network address and generate respective hash values 210 for the prefixes 208 of the network address. For example, the search engine 106 includes an address parsing unit (not shown) that receives an address and manipulates the address to generate various lengths prefixes of the address, in an embodiment. In some embodiments, the address parsing unit also manipulates the generated prefixes of the address, for example to suitably compress the prefixes to correspond to compressed prefixes stored in the routing table 108. In an embodiment, each (uncompressed or compressed) prefix is then provided to the corresponding hash function engine 206. Alternatively, in another embodiment, each hash function engine 206 receives the address, generates a respective prefix of the address and, if necessary, manipulates (e.g., compresses) the prefix., and generates the respective hash value 210 based on the (uncompressed or compressed) prefix of the address.

Referring still to FIG. 2, in an embodiment, the hash values 210 are used to access respective Bloom filters 202.

In an embodiment, one or more bits of a hash value 210 are used to select a Bloom filter block 204 from a plurality of Bloom filter blocks 204 included in a Bloom filter 202, and one or more least significant bits of the hash value 210 are used to indicate a location in the selected Bloom filter block 204. In the embodiment of FIG. 2, five most significant bits (MSBs) of a hash value 210 are used to select a Bloom filter block 204. In an embodiment, if a Bloom filter 202 includes only one Bloom filter block 204, the one Bloom filter block 204 is selected regardless of the values of the five most significant bits. On the other hand, if a Bloom filter 202 includes multiple Bloom filter blocks 204, then respective values of the MSBs are assigned to each one of the multiple Bloom filter blocks 204, in an embodiment, For example, in an embodiment, if a Bloom filter includes two Bloom filter blocks 204, the a value of "XXXX0" of the five most significant bits of the hash value 210 selects a first Bloom filter block 204 and a value of "XXXX1" selects a second Bloom filter block 204, where X signifies a "don't care" bit. In an embodiment, a right-most bit of the five most significant bits is used to select among two Bloom filter blocks 204 of a Bloom filter 202, right-most two bits of the five most significant bits are used to select among four Bloom filter blocks 204 of a Bloom filter 202, right-most three bits of the five most significant bits are used to select among eight Bloom filter blocks 204 of a Bloom filter 204, and so on. In the example embodiment of FIG. 2, the value of "XXXX0" of the hash value 210 generated based on the prefix "Address/x" selects the Bloom filter block 204b of the Bloom filter 202b, and the value of "XXXX1" of the hash value 210 generated based on the prefix "Address/x" selects the Bloom filter block 204c of the Bloom filter 202b. In an embodiment in which five bits are used to select among a plurality of Bloom filter blocks 204 of a Bloom filter 202, the system 200 can select among a maximum of 32 Bloom filter blocks 204. Other suitable numbers of bits and/or other suitable bit location in a hash value 210 are used to select among a plurality of Bloom filter blocks 204 of a Bloom filter 202, in other embodiments.

In some embodiments, multiple hash function engines 206 are associated with a Bloom filter block 204 and are used to access the Bloom filter blocks 204. The multiple hash function engines 206 receive a prefix and calculate respective hash values based on the received prefix. The search engine 106 accesses Bloom filter blocks according to a suitable scheme that uses multiple hash values to access a single Bloom filter block 204, in an embodiment. Generally speaking, a Bloom filter accessed using a single hash function has a greater false positive probability compared to the false positive probability of the same Bloom filter accessed using multiple hash functions. However, using multiple hash values to access a single Bloom filter generally requires a higher bandwidth memory used to stores the Bloom filter. In an embodiment, a plurality of Bloom filter blocks including in a Bloom filter generally increase memory bandwidth in proportion to the number of Bloom filter blocks included in the Bloom filter. Because each Bloom filter block is accessed using a respective hash value, a Bloom filter having a plurality of Bloom filter blocks has a lower false positive probability compared to a Bloom filter of the same size stored in a single memory, in at least some embodiments. Accordingly, breaking up a Bloom filter 202 into a plurality of Bloom filter blocks 204 generally reduces false positive probability of the Bloom filter 202, in at least some embodiments.

In any event, outputs of the Bloom filter blocks 204 are provided to a resolution block 212 which selects a respective output of each of the Bloom filters 202 and generates a bit vector 214 indicating which one or ones of the prefixes 206 potentially have matches in the routing table 108. For example, the bit vector 214 includes a bit corresponding to each prefix length that was used to query the Bloom filters 202. In an embodiment, a bit corresponding to a particular Bloom filter 202 is set to a logic one to indicate that the Bloom filter 202 returned a positive indication for the prefix 206 provided to the Bloom filter 202 or and is set to a logic zero to indicate that the Bloom filter 202 returned a negative indication for the prefix 206 provided to the Bloom filter 202, or vice versa. The search engine 106 utilizes the bit vector 214 to determine which one or ones of the prefixes 206 should be used to access the routing table 206 in a lookup operation to find a longest prefix match in the routing table 108. For example the search engine 106 accesses the routing table using the prefixes indicated by the bit vector 214 as potentially having a match index in the routing table 108 beginning with the longest one of the prefixes and, if necessary, continuing in decreasing length order of the prefixes. The lookup operation is completed when a matching index is found in the routing table 108 or when the all of the prefixes indicated by the bit vector 214 as potentially having matches are utilized to access the routing table 108 and no match is found in the routing table 108. If the lookup operation finds a match in the routing table 108, then the search engine 106 retrieves routing from the matching entry in the routing table 108 and provides the routing information to the PPE 104, in an embodiment.

Figure 3:
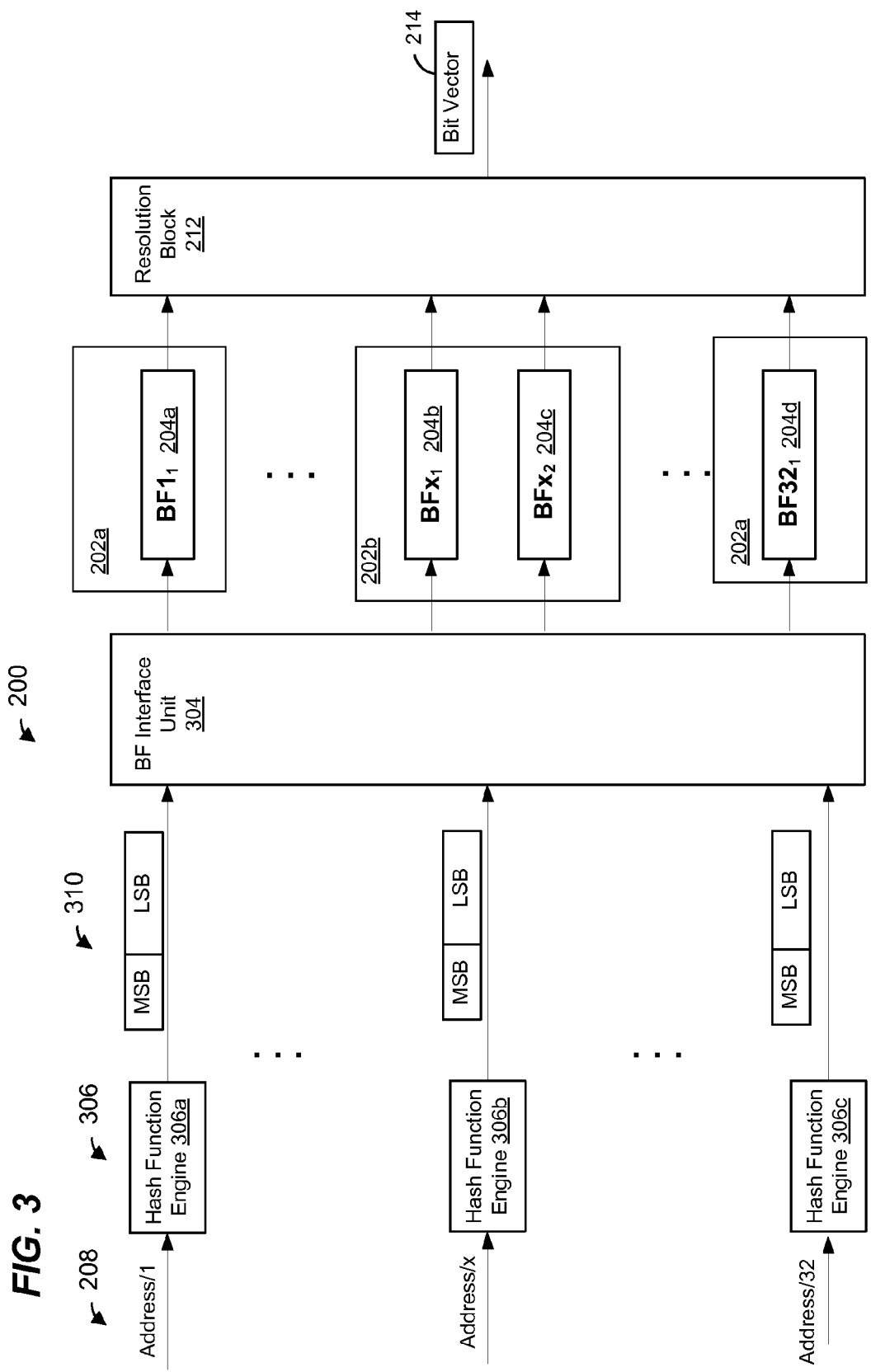
FIG. 3 is a block diagram of a an example Bloom filter system that is utilized as the Bloom filter system of the network device of FIG. 1, according to another embodiment.

Turning briefly to FIG. 3, this figure is a block diagram of a an example Bloom filter system 300 that is utilized as the Bloom filter system 110 of the network device 100 of FIG. 1, according to another embodiment. The Bloom filter system 300 is similar to the Bloom filter system 200 of FIG. 2 except that the Bloom filter system 300 includes only one hash engine 306 for each one of the Bloom filters 202 compared to a separate hash function engine 206 for each of the Bloom filter blocks 204 in the Bloom filter system 200 of FIG. 2. In an embodiment, the hash function engines 306 receive an address, or receive respective prefixes of an address, and generate respective hash values 310 based on respective prefixes of the address. Outputs of the hash engines 306 are coupled to a Bloom filter interface unit 304 that directs the LSB values of the hash values 310 to appropriate ones of the Bloom filters blocks 302. For example, the interface unit 304 selects the Bloom filter blocks 204 based on the prefix lengths associated with the Bloom filter blocks 204 and/or based on MSBs of the hash values 310, in an embodiment. In other embodiments, the Bloom filter system 300 includes other suitable numbers of hash function engines 306. Generally speaking, the Bloom filter system 300 includes N hash function engines 306 and X Bloom filters 202, where N and X are positive integers in an embodiment. The interface unit 304 connects the N hash function engines 306 to the X Bloom filters 202, in this embodiment.

Figure 4A:
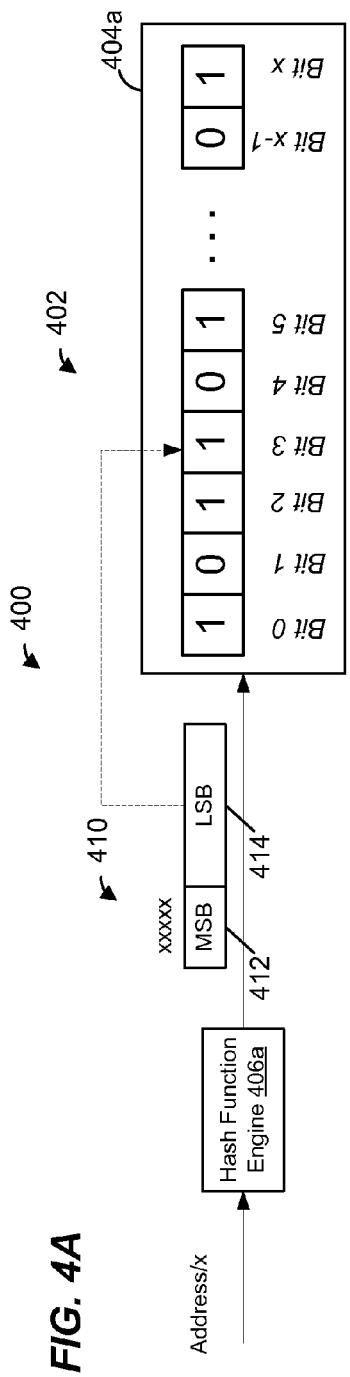
FIGS. 4A-4C are diagrams that depict a process 400 for increasing a size of a Bloom filter, according to an embodiment.
Figure 4B:
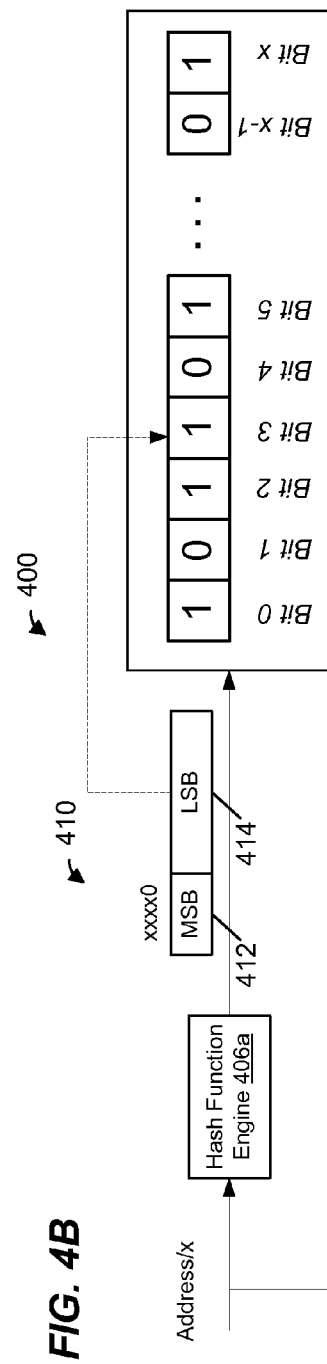
Figure 4C:
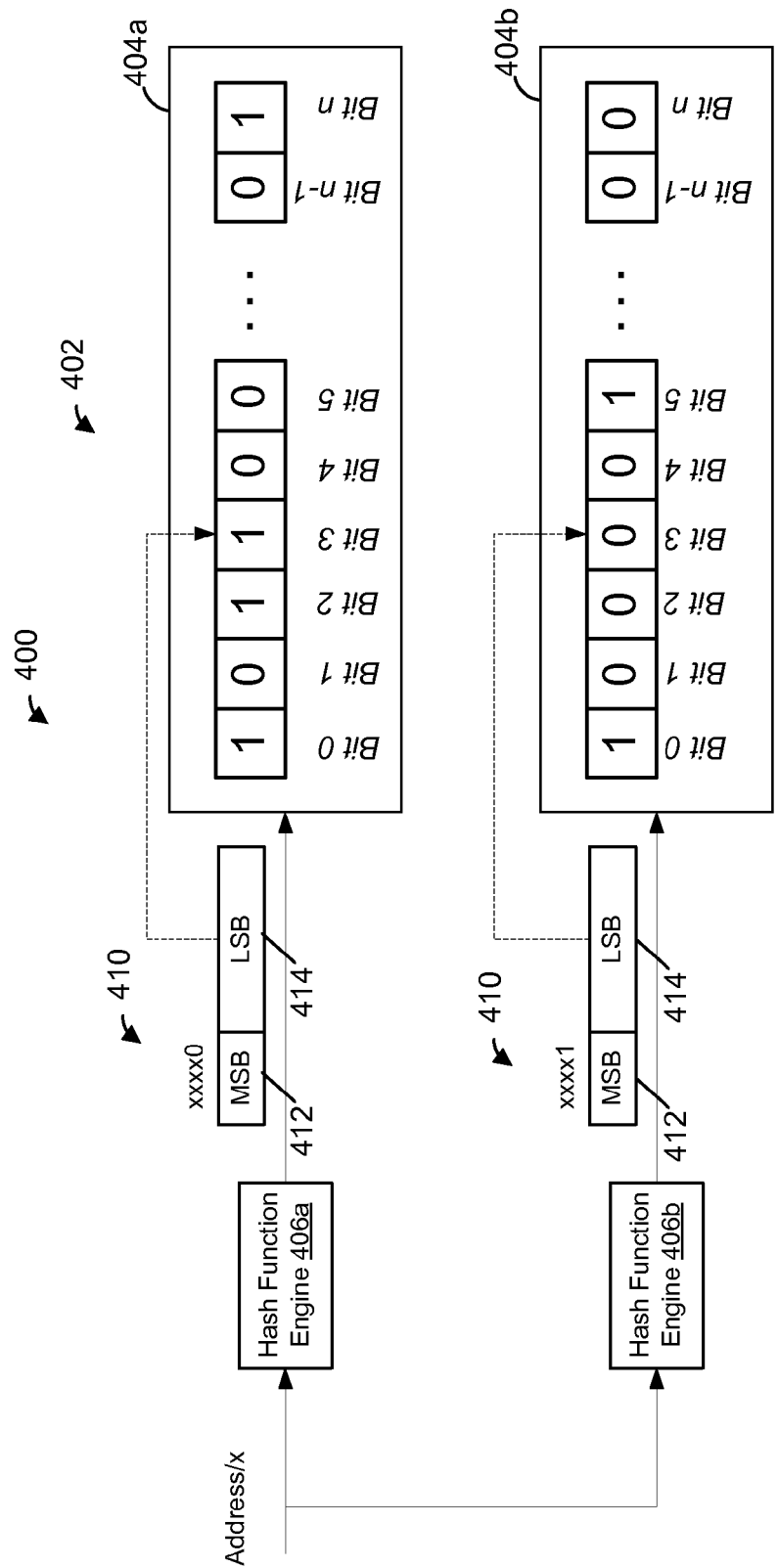

FIGS. 4A-4C are diagrams that depict different stage of an example process 400 for increasing a size of a Bloom filter, according to an embodiment. In an embodiment, the process 400 is used with the network device 100 of FIG. 1. For example, referring to FIG. 1, the process 400 is performed at least partially by the BF controller 114, in an embodiment. With continued reference to FIG. 1, the process 400 is performed at least partially by the packet processing element 104 and/or the routing update unit 120, in some embodiments. For ease of explanation, the process 400 is described below in conjunction with the network device 100 of FIG. 1.

Referring first to FIG. 4A, a Bloom filter 402 includes a single Bloom filter block 404a coupled to a hash function engine 406a. The Bloom filter block 404a is configured to represent a set of prefixes of length x in the routing table 108. In an embodiment, all bits of the Bloom filter 404a are set to a default value, such as a logic 0. When a prefix of length x is inserted into the routing table 108, the prefix is provided to the hash function engine 406a. The hash function engine 406a receives the prefix and calculates a hash value 410 based on the prefix. The hash value 410 includes a set of one or more most significant bits 412 and a set of one or more least significant bits 414. In an embodiment, the most significant bits 412 select a Bloom filter block 404 of the Bloom filter 404a. Because the Bloom filter 402 includes only one Bloom filter block 404a, the Bloom filter block 404a is selected regardless of the values of the most significant bits 412. The least significant bits 414 indicate a location in the selected Bloom filter block 404a. The indicated location in the Bloom filter block 404a is set to a certain logic value (e.g., a logic 1) to indicate membership of the prefix 408 in the set of prefixes of length x stored in the routing table 108, in an embodiment. As more prefixes are inserted into the routing table 108, the fill level (i.e., the number of bits set to a logic 1) of the Bloom filter block 404a increases, in an embodiment. Generally speaking, false positive probability of the Bloom filter 402 is directly proportional to the number of prefixes represented by the Bloom filter 402 and is inversely proportional to the total number of bits in the Bloom filter 402. Thus, for a given number of bits in the Bloom filter block 404a, as the number of prefixes represented by the Bloom filter block 404a increases, false positive probability for the Bloom filter 402 also increases.

In FIG. 4B, the controller 114 has detected that the size of the Bloom filter block 404a is not sufficient for representing the set of prefixes of length x currently stored in the routing table 108. For example, the controller 114 calculates false positive probability of the Bloom filter 402 based on the number of bits in the Bloom filter 402 and the number of prefixes of length x represented by the Bloom filter 402, or the number of bits set to a logic one in the Bloom filter 402, in an embodiment. The controller 114 compares the calculated false positive probability to a predetermined threshold, and detects that the size of the Bloom filter 402 should be increased when the calculated false positive probability exceeds the predetermined threshold. In another embodiment, the controller 114 (or another device) collects false probability statistics, for example based on operation of the Bloom filter 402 or based on operation of a set of Bloom filters, and utilizes the collected statistics to determine that the size of the Bloom filter 402 should be increased.

In an embodiment, in response to detecting insufficient size of the Bloom filter block 404a, the controller 114 adds an additional block 404b to the Bloom filter 402. Adding the additional Bloom filter block 404b to the Bloom filter 402 increases the number of bits in the Bloom filter 402 thereby decreasing the false positive probability of the Bloom filter 402 for the same set of prefixes of length x stored in the routing table 108. The controller 114 then copies the contents of the Bloom filter block 404a to the Bloom filter block 404b. The controller 114 then assigns a first value of the most significant bits 412 to the first Bloom filter block 404a and a second value of the most significant bits 412 to the second Bloom filter block 404b, and enables the Bloom filter block 404b. Because contents of the Bloom filter block 404a are copied to the Bloom filter block 404b prior to using the respective values to select a particular one of the Bloom filter blocks 404a, 404b, operation of the filter system that includes the Bloom filter 402 need not be interrupted during the expansion process of the Bloom filter 402, in at least some embodiments. In other words, because at this stage of the process 400, both of the Bloom filter block 404a and the Bloom filter block 404b represent the set of prefixes of length x in the routing table 108, selecting either the block 404a or the block 404b will produce an indication of whether a particular prefix is potentially stored in the routing table 108. Thus, for a given prefix, the Bloom filter 402 will provide the same indication of whether the prefix has a match in the routing table 108 regardless of the value of the MSB bits 412 of the hash value 410 generated for the prefix, and accordingly regardless of which one of the blocks 404a and 404b is selected based on a hash value for the prefix.

The controller 114 then reconfigures the Bloom filter blocks 404a, 404b to represent respective, non-overlapping, subsets of the set of prefixes represented by the Bloom filter 402, in an embodiment. As an alternative to copying contents of the Bloom filter block 404a to the Bloom filter block 404b, assigning respective selection values to the Bloom filter blocks 404a, 404b, enabling the Bloom filter block 404b, and then reconfiguring the Bloom filter blocks 404a, 404b, in another embodiment, the controller 114 configures the Bloom filter block 404b to represent a subset of the set of prefixes represented by the Bloom filter 402 prior to assigning respective selection values to the Bloom filter blocks 404a, 404b and enabling the Bloom filter block 404b. Then, after enabling the Bloom filter block 404b, the controller 114 reconfigures the Bloom filter block 404a to represent the subset of prefixes not represented by the Bloom filter block 404b, in an embodiment. Similar to the implementation described above, operation of the Bloom filter system that includes the Bloom filter 402 need not be interrupted during the expansion process of the Bloom filter 402, in this embodiment. To reconfigure the Bloom filter blocks 404a and 404b, the controller 114 generally sets to a logic 1 bit locations, in the Bloom filter block 404a and 404b, that respectively correspond to the subset of prefixes represented by the Bloom filter blocks 404a, 404b, and sets the remaining bit locations in the Bloom filter blocks 404a, 404b to a logic 0, or vice versa, in an embodiment. An example process that reconfigures the Bloom filter blocks 404a, 404b, according to an embodiment, is described in more detail with respect to FIG. 4C.

Referring now to FIG. 4C, the Bloom filter blocks 404a and 404b are reconfigured such that each of the blocks 404a and 404b represents a subset of the set of prefixes of length x stored in the routing table 108. In particular, the Bloom filter block 404a is reprogrammed to represent a subset of prefixes of length x that hash to a value of "XXXX0" of the MSBs 412, and the Bloom filter block 404a is reprogrammed to represent a subset of prefixes of length that hash to a value of "XXXX1" of the MSBs, 412 in an embodiment. In an embodiment, reprogramming the Bloom filter blocks 404a, 404b involves recalculating hash value for the set of prefixes of length x stored in the routing table 108. In an embodiment, the routing update unit 120 assists in reconfiguring the Bloom filter block 404a, 404b. For example the routing table update unit 120 recalculates hash values for the prefixes of length x stored in the routing table 108 and reconfigures the Bloom filter blocks 404a, 404b, and reconfigures the Bloom filter blocks 404a, 404b based on the recalculated hash values. In another embodiment, the update unit 120 maintains respective counting Bloom filters for respective sets of prefixes of length x stored in the routing table 108. In this embodiment, the update unit need not recalculate hash values for the set of prefixes. Instead, the update unit 108 reconfigures the Bloom filter blocks 404a, 404b based on the respective sets of counting Bloom filters maintained by the update unit 120.

To reconfigure the Bloom filter blocks 404a, 404b, the update unit 120 sets to a logic zero bits at locations in the Bloom filter blocks 404a, 404b that correspond to the subset of prefixes represented by the other one of the filter blocks 404a, 404b according to the hash values for the prefixes of lengths z stored in the routing table 108, in an embodiment. In particular, for a subset of prefixes that hash to a value "XXXX0" of the MSBs 412, corresponding bit locations in the Bloom filter block 404b are reset to a logic zero. Similarly, for a set of prefixes that hash to a value of "XXXX1" of the MSBs 412, corresponding bit locations in the Bloom filter block 404a are reset to a logic 0. In the resulting Bloom filter 402, the ratio of bits set to one to the total number of bits in the Bloom filter 402 is reduced and, accordingly, false positive probability of the Bloom filter 402 is reduced, in an embodiment.

In an embodiment, to decrease the size of a Bloom filter, a host devices, such as the routing update unit 120, performs an OR operation to combine contents of multiple Bloom filter blocks of the Bloom filter, and reconfigures one of the Bloom filter blocks of the Bloom filter based on the result of the OR operation performed for the blocks of the Bloom filter. As a result, the single Bloom filter block is configured to represent the set of prefixes of length x previous represented by the multiple Bloom filter blocks of the Bloom filter. Thus, for example, referring still to FIG. 4C, in an example scenario the controller 114 detects that the size of the Bloom filter 402 should be decreased. For example, the controller 114 detects that the size of the Bloom filter 402 should be decreased when false positive probability of the Bloom filter 402, calculated or statistically determined for the Bloom filter 402, is below a predetermined threshold, in an embodiment. The controller 114 then indicates to the routing update unit 120 that the size of the Bloom filter 402 should be decreased. The routing update unit 120 performs and OR operation of corresponding bits of the Bloom filter blocks 404a, 404b. The results of the OR operation are used to reconfigure the blocks 404a, and the block 404b is then removed from the Bloom filter 402. For example, the controller 114 removes association between the block 404b and the set of prefixes of length x, and assigns a value of XXXXX of the MSBs 412 to the block 404a, in an embodiment. The block 404b is now available to be added to another Bloom filter in the set of Bloom filters 111, in an embodiment.

Figure 5:
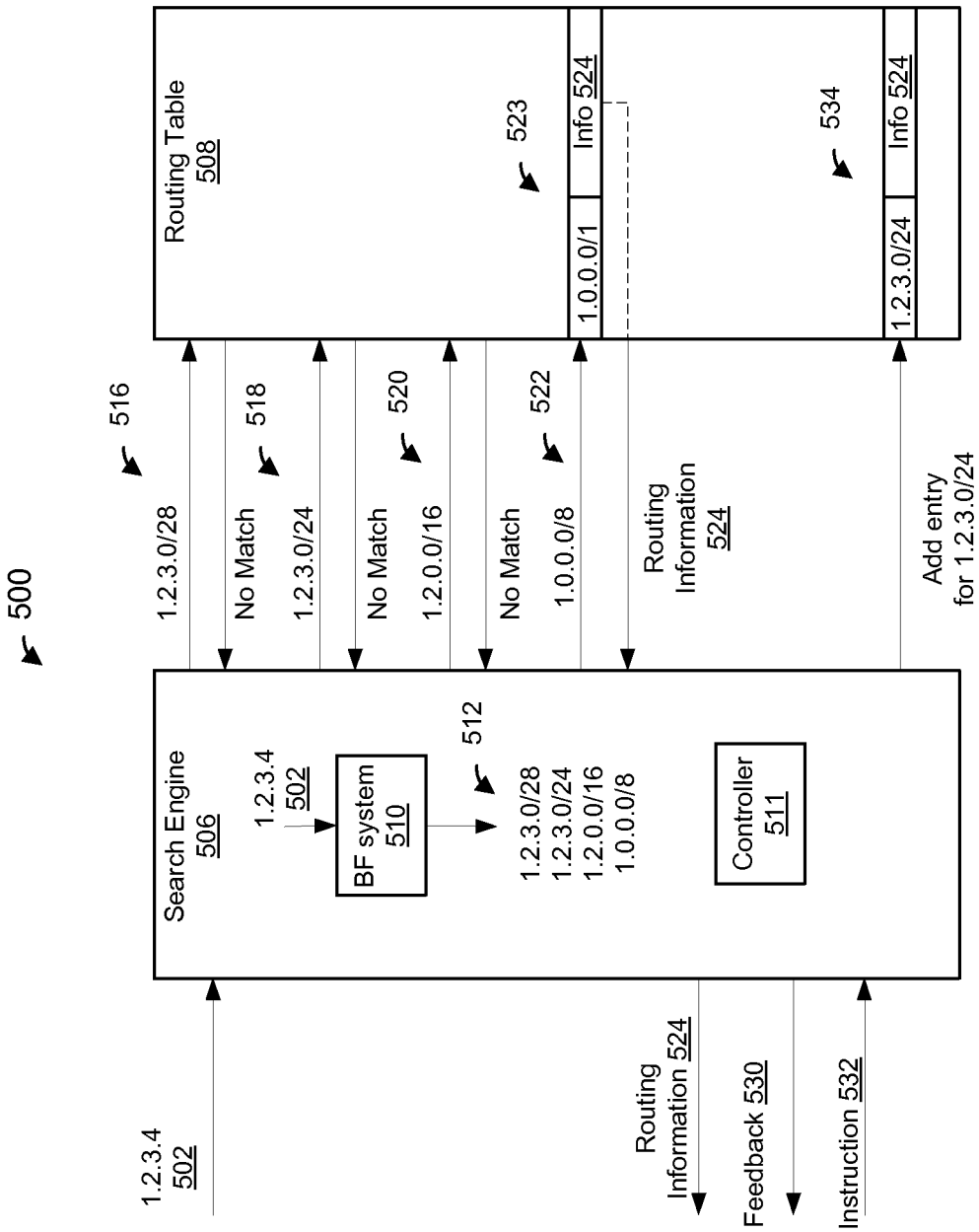
FIG. 5 is a diagram of a system that utilizes an adaptive mode to adapt a routing table in response to detecting an inefficient lookup performed in the routing table, according to an embodiment.

FIG. 5 is a diagram of a system 500 that utilizes an adaptive mode to adapt a routing table in response to detecting an inefficient lookup performed in the routing table, such as a lookup associated which a relatively large number of memory accesses to the routing table, according to an embodiment. The system 500 is utilized with the network device 100 of FIG. 1, in an embodiment. As illustrated in FIG. 5, the system 500 includes a search engine 506 coupled to a routing table 508. The search engine 506 includes a Bloom filter system 510 and an adaptive controller 511. With reference to FIGS. 1 and 5, the search engine 506 corresponds to the search engine 106 and the routing table 510 corresponds to the routing table 108, in an embodiment. With continued reference to FIGS. 1 and 5, the Bloom filter system 510 corresponds to the Bloom filter system 110, and the adaptive controller 511 corresponds to the adaptive controller 116, in an embodiment.

In the example scenario of FIG. 5, the search engine 506 obtains, from a packet processing element (e.g., from the packet processing element 104 of FIG. 1) a network address 502. The network address 502 is an IPv4 address, for example. The network address 502 is illustrated in FIG. 5 using quad-dotted notation as an address 1.2.3.4. The search engine 506 provides the address 502 to the Bloom filter system 510. In response to receiving the address 502, the Bloom filter system 510 returns a set of prefixes 512 of the address 502 that potentially have a match in the routing table 508. In particular, in the example scenario illustrated in FIG. 5, the set of prefixes 512 includes prefixes 1.2.3.0/28, 1.2.3.0/24, 1.2.0.0/16 and 1.0.0.0/8.

As discussed above, a positive indication obtained from a Bloom filter, indicating that a particular prefix potentially has a match in a routing table may be a false positive indication, in some situations. The search engine 506, therefore, may need to perform multiple memory accesses to the routing table 508 in order to find a match in the routing table 508 or to determine that a match does not exist in the routing table 508. The search engine 506 performs a first memory access 516 to the routing table 508 using the longest prefix 1.2.3.0/28 in the set of prefixes 512. The first memory access 516 fails to find a match for the prefix 1.2.3.0/28. The search engine 506 then performs a second memory access 518 using the next longest prefix 1.2.3.0/24 in the set of prefixes 512. The second memory access 518 fails to find a match for the prefix 1.2.3.0/24 in the routing table 508. Similarly, a third memory access 520, performed using the third longest prefix 1.2.0.0/16, fails to find a match for the prefix 1.2.0.0/16 in the routing table 508. The search engine 506 then performs a fourth memory access 522 using the fourth longest prefix 1.0.0.0/8 in the set of prefixes 512. The fourth memory access 522 finds a matching entry 523 for the prefix 1.0.0.0/8 in the routing table 508. The search engine 506 retrieves routing information 524 (e.g., a next hop indicator) from the matching entry 523, and provides the routing information 524 to the packet processing element that provided the address 502, such as the packet processing element 104, in an embodiment.

With continued reference to FIG. 5, in an embodiment, the adaptive controller 511 evaluates the number of memory accesses that were performed by the search engine 506 to find the matching entry 523 for the address 502. For example, the adaptive controller 511 compares the number of memory accesses to a predetermined threshold. In an embodiment, the predetermined threshold used by the controller 511 to evaluate the number of memory access performed during a lookup operation by the search engine 506 is configurable. If the number of memory accesses performed by the search engine 506 exceeds the predetermined threshold, then the controller 511 generates feedback indicating that the memory access budget was exceeded by the search engine 506. As an example, in an embodiment, the predetermined threshold is set to two memory accesses. Because four memory accesses were performed by the search engine 506 for the lookup performed for the address 502, the controller 511 generates feedback 530 indicating that memory access budget was exceeded during the lookup operation for the address 502. The search engine 506 provides the feedback 530 to a host device, in an embodiment. For example, referring to FIG. 1, the search engine 506 provides the feedback 530 to the packet processing element 104 and/or to the update unit 130, in an embodiment. In response to receiving the feedback 530, the host device generates an instruction 532 instructing the search engine 506 to adapt the routing table 508 to the address 502. For example, the instruction 532 instructs the search engine 506 to add an association to the routing table 508 between the routing information 524 an a prefix of the address 502 that is longer than the prefix 1.0.0.0/8 for which a match was found in the routing table 508. In response to receiving the instruction 532, the search engine 506 inserts a new entry 534 into the routing table 508. The new entry 534 includes (i) a prefix of the address 502 that is longer than the prefix 1.0.0.0/8 for which a match was found in the routing table 508, and (ii) the routing information 534 retrieved from the routing table 508 based on the prefix 1.0.0.0/8, in an embodiment.

An association between a longer prefix of the address 502 and the routing information 524 obtained for the address 502 ensures that fewer memory accesses will be performed for subsequent lookup operations based on the address 502, such as for processing subsequent packets associated with the address 502, in at least some embodiments and/or scenarios. The particular longer prefix of the address 502 that is inserted into the routing table 508 can generally be any suitable prefix of the address 502 that is longer than the prefix 1.0.0.0/8, in various embodiments and/or scenarios. In the embodiment of FIG. 5, a prefix 1.2.3.0/24 from the set of prefixes 512 is selected. As a result, lookups for subsequent packets associated with the address 1.2.3.4 will require only two memory accesses to the routing table 508, in at least some embodiment and/or situations. In another embodiment, another suitable prefix of the address 502, such as another prefix from the set of prefixes 512 or another prefix not included in the set of prefixes 512, is used. For example, the complete address 502 (i.e., prefix 1.2.3.4/32) is used, in an embodiment. Because the Bloom filter system 510 will then provide a positive indication for the longest possible (32-bit) prefix of the address 502, using the complete address 502 ensures that only one memory access will be needed for subsequent lookups performed by the search engine 506 based on the address 502, in an embodiment. In other embodiments, other suitable prefixes are selected. If a prefix that is not in the set of prefixes 512 is used, the Bloom filter system 510 is updated based in the prefix to ensure that the Bloom filter system 510 will return a positive indication in subsequent queries for the address 502, in some embodiments and/or scenarios.

In an embodiment, new associations are inserted into the routing table 508, using the adaptive mode techniques described above, during run-time, and in the data plane (e.g., using hardware/firmware components) of the network device 100. As a result, in this embodiment, the adaptive mode ensures that these associations become available relatively quickly for processing subsequent packets associated with the detected address, thereby ensuring a relatively small or negligible performance loss due to the initially high number of lookups performed based on the detected address, in at least some embodiments.

In some embodiments, the system 500 is configured to subsequently delete new associations inserted into the routing table 508 in response to receiving instructions to adapt the routing table 508. For example, the system 500 is configured to delete such new associations inserted into the routing table 508 using an aging scheme according to which an entry is deleted when a certain amount of time has passed since the entry was inserted, or an entry is deleted if the entry has not been accessed in a certain period of time.

FIGS. 6A-6D are diagrams of example compressed entry formats used in a routing table, in some embodiments. Compressing entries of a routing table allows the routing table to be stored using less memory and/or allows more information (e.g., more entries) to be stored in the routing table. The compressed entry formats of FIGS. 6A-6D are used in the routing table 108 of FIG. 1 or the routing table 508 of FIG. 5, in some embodiments and/or scenarios.

Referring first to FIG. 6A, an entry format 600 includes a first prefix field 602, a second prefix field 604 and a third prefix field 606, and a routing information (e.g., next hop) field 608. In an embodiment, the fields 602-606 are used to store a compressed form of a prefix, and the field 608 stores the routing information associated with the prefix. In an embodiment, the first prefix field 602 stores an indication of a length X of the prefix, for example by storing a number of logic is that corresponds to the number of "don't care" bits in the address corresponding to the prefix, the second prefix field 604 stores a single zero-bit, and the third prefix field 466 stores the actual prefix. As merely an illustrative example, to store a prefix 2.3.4.0/24 of a 32-bit address, the field 602 stores "11111111" to indicate the prefix length (24 bits) of the 32-bit address, the field 604 stores a single zero bit "0", and the field 606 stores the actual 24-bit prefix 2.3.4.0/24, in an embodiment.

Referring now to FIG. 6B, an entry format 620 includes a polynomial division quotient field 622 and a routing information (e.g., next hop) field 624. The polynomial division quotient field 622 stores the quotient of a hash function polynomial division operation based on a prefix of an address. The entry format 620 is used in some embodiments in which polynomial division is used as a hash function to access the routing tables. In an embodiment, instead of storing a complete prefix, the entry format 620 stores the quotient generated, using the hash function, based on the prefix. The entry 620 is accessed using the remainder generated, using the hash function, based on the prefix, and the quotient stored in the entry 620 is retrieved from the entry 620, in an embodiment. Then a prefix is calculated using the quotient retrieved from the entry 620, in an embodiment. The prefix is calculated, for example, by multiplying the quotient retrieved from the entry 620 by the polynomial that was used by the hash function, and adding, to the result of the multiplication, the remainder that was used to access the entry 620, in an embodiment. If the calculated prefix matches the prefix of the address, then it is determined that the entry 620 is a match for the prefix of the address, and routing information retrieved from the field 624 is used to route the packet associated with the address, in an embodiment.

Referring now to FIG. 6C, an entry format 630 includes, in a single entry, routing information for a prefix X and for children prefixes of the prefix X up to a certain level, such as four additional bits of the address that immediately the prefix X in the address, for example. In some embodiments, the entry format 630 is used for entries corresponding to densely populated portions of a routing table. For example, in an embodiment, the entry format 630 is used for entries associated with 20-24 bit prefixes in an IPv4 routing table, in an embodiment. The entry format 630 includes a first field 632 that stores a prefix of length X and a plurality of second fields 634 that are used to store routing information associated with the prefix stored in the first field 432 and a set of children of the prefix stored in the first field 632. In the example embodiment of FIG. 6C, the entry 630 includes 16 fields 634 to store routing information associated with prefixes that share the first X bits of the prefix and have different combinations of the following four bits. When a match is found in the field 632 based on a prefix of length X of an address, an appropriate field 634 that contains routing information (e.g., next hop) for the address is selected based on the four bits immediately following the prefix of length X in the address. Thus, for example, a value of 0000 of the bits that follow the prefix of length X in the address, select routing information in the field 634-1, a value of 0001 of the bits that follow the prefix of length X in the address selects routing information in the field 634-2, and so on, in an example embodiment. If routing information for a particular child of the prefix in the field 632 does not exist in the routing table, then the corresponding field 634 includes default routing information (e.g., default next hop) for the prefix of length X in the field 632, in an embodiment. It is noted that for routing table entries formatted according to the format 630, a single Bloom filter is needed for all the prefixes included in a routing table entry, in an embodiment. Thus, fewer Bloom filters are used compared to embodiments with non-compressed routing table entries, in at least some embodiments. For example Bloom filters corresponding to only the prefix lengths in increments of four (0, 4, 8, 12, etc.) are used, in an example embodiment.

Referring now to FIG. 6D, an entry 640 contains routing information for a plurality of network address prefixes. The entry format 640 allows multiple prefixes to be stored in a single entry (e.g., a single memory row) of a routing table, for example to efficiently utilize memory space of the routing table, in at least some embodiments. The entry format 640 is used for entries corresponding to sparsely populated portions of a routing table, in some embodiments. The entry 640 includes a first plurality of fields 642 that are used for storing address prefixes, and a second plurality of field 644 that are used for storing routing information associated with the prefixes. In an embodiment, the fields 642 store prefixes of successively longer lengths, wherein the longer prefixes share leading bits with the shorter prefixes. For example, a prefix of length X1, stored in the field 642-1, is the shortest prefix of the set of prefixes stored in the entry 640. A prefix of length X2, stored in the field 642-2 is a longer prefix with respect to the prefix of length X1 stored in the field 642-1, and shares leading bits with the prefix of length X1 stored in the field 642-1, in an embodiment. A match for an address is found based on the shortest prefix of the address, stored in the field 642-1, and appropriate routing information for the address is selected based on comparing the remaining prefixes with corresponding prefixes of the address, in an embodiment.

In some embodiments, a routing table (e.g., the routing table 108 of FIG. 1 or the routing table 508 of FIG. 5) includes entries formatted according to any combination of multiple ones of the formats 600, 610, 630 and 640 described above. In some embodiments, several modes are defined for accessing the routing table. The different modes include one or more of a default mode, a densely populated portion mode, a sparsely populated portion mode, an IPv4 address mode, and IPv6 address mode, etc., in various embodiments. For example, a routing table includes a first set of entries corresponding to densely populated address ranges in the routing table and formatted according to the format 630, and a second set of entries that correspond to sparsely populated address ranges in the routing table and are formatted according to the format 640, in an example embodiment. Accordingly, the routing table is accessed based on the format 630 or the format 640 according to whether an address corresponds to a densely populated address range or a sparsely populated address range, in an embodiment. Further, continuing with the same example routing table, the routing table utilizes the format 600 or the format 610 as a default entry format, in an embodiment.

Figure 7:
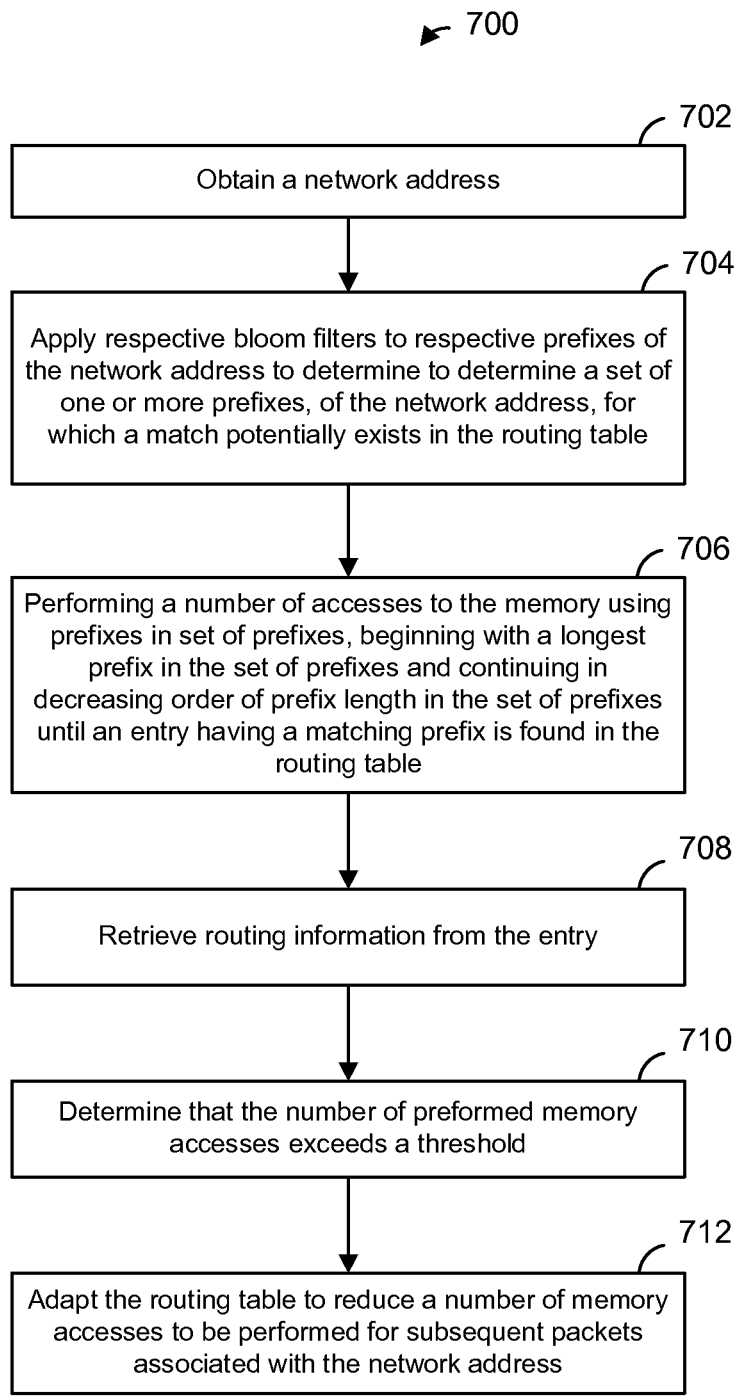
FIG. 7 is a flow diagram of an example method for performing longest prefix match lookup operations in a memory storing a routing table used for forwarding packets in a network device, according to an embodiment.

FIG. 7 is a flow diagram of an example method 700 for performing longest prefix match lookup operations in a memory storing a routing table used for forwarding packets in a network device, according to an embodiment. In an embodiment, the method 700 is implemented by the switching device 100 of FIG. 1. For example, the method 700 is implemented at least partially by the adaptive search engine 106 of FIG. 1 or the search engine 506 of FIG. 5, in an embodiment. In other embodiments, the method 700 is implemented by other suitable components of the switching device 100 or by another suitable network device.

At block 702, a network address associated with a packet is obtained. The network address is an address extracted from a header of the packet, in an embodiment. For example, a 32-bit IPv4 address is obtained, in an embodiment. As another example, a 128-bit IPv6 address is obtained, in another embodiments. At block 704, respective Bloom filters are applied to respective prefixes of the address obtained at block 702. Also Based on applying the respective Bloom filters at block 702, a set of one or more prefixes indicated by the Bloom filters as potentially having a match in the routing table is identified at blocks 704, in an embodiment.

At block 706, a number (one or more) of memory accesses to the routing table is/are performed based on the set of prefixes identified at block 704. The memory accesses at block 706 are performed using one or more prefixes of the set of prefixes identified at block 704, beginning with the longest one of the prefixes in the set of prefixes and, if no match is found in the routing table for the longest one of the prefixes continuing in decreasing order of lengths of the prefixes until an entry having a matching prefix is found in the routing table.

At block 708, routing information is retrieved from the entry having the matching prefix found at block 706. At block 710, it is determined that the number of memory accesses performed at block 706 exceeds a certain threshold maximum number of memory accesses. At block 712, in response to detecting that the number of memory accesses performed at block 706 exceeds the threshold, the routing table is adapted to reduce the number of memory accesses for subsequent packets associated with the same network address. For example, a new entry is inserted into the routing table to adapt the routing table, in an embodiment. The new entry associates a longer prefix of the address with the routing information retrieved from the routing table using a shorter prefix of the address for which a matching entry is found at block 704, in an embodiment.

Figure 8:
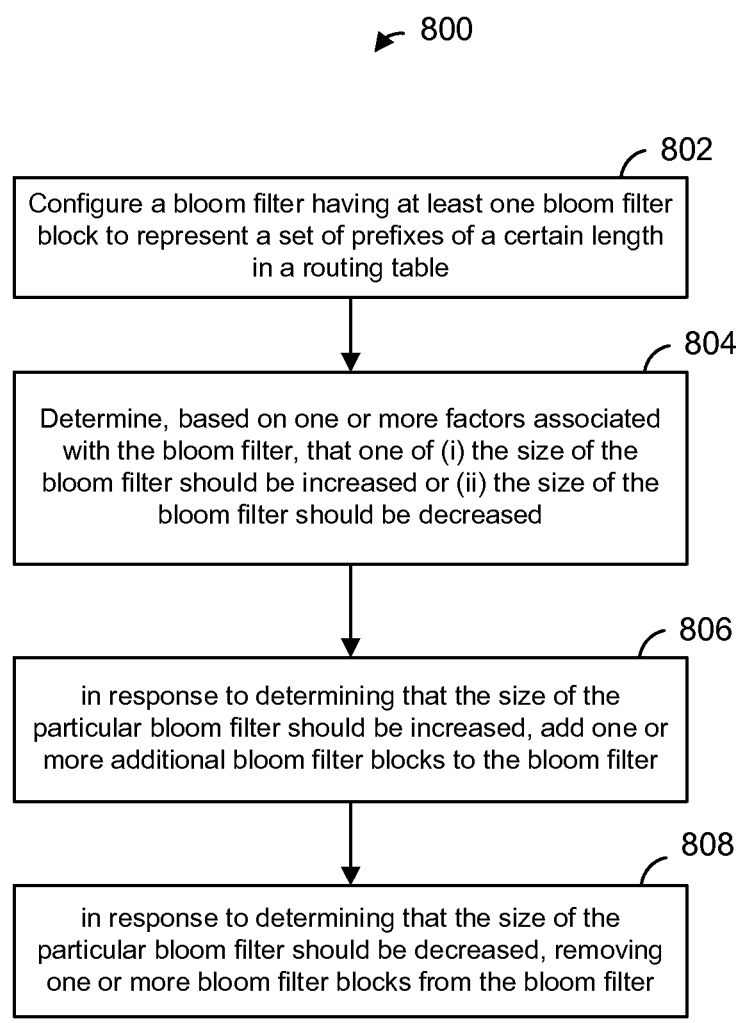
FIG. 8 is a flow diagram of an example method for dynamically adjusting a size of a Bloom filter, according to an embodiment.

FIG. 8 is a flow diagram of an example method 800 for dynamically adjusting a size of a Bloom filter that represents a dynamically changing set of prefixes in a routing table, according to an embodiment. In an embodiment, the method 800 is implemented by the switching device 100 of FIG. 1. For example, the method 800 is implemented at least partially by the adaptive search engine 106 of FIG. 1 or the search engine 506 of FIG. 5, in an embodiment. In other embodiments, the method 800 is implemented at least partially by other suitable components of the switching device 100 or by another suitable network device.

At block 802, a Bloom filter having at least one Bloom filter block is configured to represent a set of prefixes of a certain length in the routing table. At block 804, it is determined that one of that one of (i) the size of the Bloom filter should be increased or (ii) the size of the Bloom filter should be decreased. The determination at block 804 is made based on one or factors associated with the Bloom filter. For example, the determination is made based on one or more of fill level of the Bloom filter, false positive probability calculated for the Bloom filter, false positive probability statistically determined from the Bloom filter, another suitable factor associated with the Bloom filter, etc., in various embodiments. When it is determined that the size of the Bloom filter should be increased, at block 806 additional one or more boom filter blocks are added to the Bloom filter. On the other hand, when it is determined that the size of the Bloom filter should be decreased, at block 808 one or more Bloom filter blocks are removed from the Bloom filter.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable medium or media such as a magnetic disk, an optical disk, a RAM or ROM or flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method for performing longest prefix match lookup operations in a memory storing a routing table used for forwarding packets in a network device, the method comprising:
   receiving, at a search engine of the network device, a network address associated with a packet, wherein the network address is provided by a packet processor of the network device, the packet processor configured to perform processing of the packet at least to determine a forwarding decision for the packet, and wherein the search engine includes a plurality of Bloom filters, each of at least some of the Bloom filters representing prefixes of a respective certain length in the routing table;
   applying, by the search engine, respective Bloom filters of the plurality of Bloom filters to respective prefixes of the network address to determine a set of one or more prefixes, of the network address, for which a match potentially exists in the routing table;
   performing, by the search engine, a number of accesses to the memory using prefixes in the set of prefixes, beginning with a longest prefix in the set of prefixes and continuing in decreasing order of prefix length in the set of prefixes until an entry having a matching prefix is found in the routing table;
   retrieving, by the search engine, from the entry in the routing table, routing information for the packet;
   determining, by the search engine, that the number of performed memory accesses exceeds a threshold; and
   in response to determining that the number of performed memory accesses exceeds the threshold,
   generating, by the search engine, a feedback signal indicating that the number of performed memory accesses based on the network address exceeds the threshold,
   providing the feedback signal from the search engine to the packet processor configured to perform processing of the packet,
   in response to providing the feedback signal to the packet processor, receiving, at the search engine from the packet processor, an instruction to adapt the routing table to the network address, and
   in response to receiving the instruction from the packet processor, adapting, by the search engine, the routing table to the network address to reduce a number of memory accesses to be performed for subsequent packets associated with the network address.

2. The method of claim 1, wherein a first Bloom filter of the plurality of Bloom filters represent prefixes of a first length in the routing table, and wherein the first Bloom filter includes:
   a first Bloom filter block that represents a first subset of prefixes of the first length in the routing table; and
   a second Bloom filter block that represents a second subset of prefixes of the first length in the routing table;
   wherein the first subset of prefixes does not overlap with the second subset of prefixes.

3. The method of claim 2, wherein applying the first Bloom filter to a prefix includes:
   calculating a hash value based on the prefix;
   using a first portion of the hash value to select the first Bloom filter block or the second Bloom filter block;
   using a second portion of the hash value to select a location in the selected one of the first Bloom filter block and the second Bloom filter block; and
   determining whether a match in the routing table potentially exists in the routing table based on the location.

4. The method of claim 1, wherein adapting the routing table comprises inserting a new entry into the routing table, wherein the new entry includes (i) a prefix of the network address, wherein the prefix is longer than the matching prefix associated with an entry found in the routing table based on the network address and (ii) the routing information retrieved from the entry found in the routing table.

5. The method of claim 1, wherein adapting the routing table is performed in a data plane of the network device.

6. The method of claim 1, further comprising:
   configuring, at the search engine, a first Bloom filter of the plurality of Bloom filters, the first Bloom filter having at least one Bloom filter block to represent a set of prefixes of a first length in the routing table; and
   dynamically adjusting, using the search engine, a size of the first Bloom filter, including:
   determining, based on one or more factors associated with the first Bloom filter, that one of (i) the size of the first Bloom filter should be increased or (ii) the size of the first Bloom filter should be decreased; and
   in response to determining that the size of the first Bloom filter should be increased, adding one or more additional Bloom filter blocks to the first Bloom filter; and
   in response to determining that the size of the first Bloom filter should be decreased, removing one or more Bloom filter blocks from the first Bloom filter.

7. The method of claim 6, wherein adding one or more additional Bloom filter blocks to the first Bloom filter comprises adding the one or more additional Bloom filter blocks without interrupting operation of the first Bloom filter.

8. The method of claim 6, wherein determining, based on one or more factors associated with the first Bloom filter, that one of (i) the size of the first Bloom filter should be increased or (ii) the size of the first Bloom filter should be decreased comprises:
    determining a false positive probability for the first Bloom filter; and
    determining that the size of the first Bloom filter should be increased when the false positive probability exceeds a first threshold; and
    determining that the size of the first Bloom filter should be decreased when the false positive probability falls below a second threshold.

9. The method of claim 6, wherein the first Bloom filter includes a first Bloom filter block and wherein adding one or more additional Bloom filter blocks to the first Bloom filter comprises:
    adding a second Bloom filter block to the first Bloom filter; and
    configuring the first Bloom filter block to represent a first subset of the set of prefixes in the routing table represented by the first Bloom filter and configuring the second Bloom filter block to represent a second subset of prefixes in the set of prefixes represented by the first Bloom filter.

10. The method of claim 9, wherein configuring the first Bloom filter block to represent the first subset of the set of prefixes in the routing table represented by the first Bloom filter and configuring the second Bloom filter block to represent the second subset of prefixes in the set of prefixes represented by the first Bloom filter comprises:
    copying contents of the first Bloom filter block to the second Bloom filter block;
    calculating a respective hash value for each of the prefixes in the set of prefixes, the hash value having a first portion and a second portion; and
    for each prefix in the set of prefixes,
        using a first portion of the hash value calculated for the prefix to determine whether the prefix belongs to the first subset of the set of prefixes or to the second subset of the set of prefixes; and
        if it is determined that the prefix belongs to the first subset, setting a location, in the second Bloom filter block, to a value that indicates that the prefix does not belong to the second subset, wherein the location is indicated by the second portion of the hash value; and
        if it is determined that the prefix belongs to the second subset, setting a location, in the first Bloom filter block, to a value that indicates that the prefix does not belong to the first subset, wherein the location is indicated by the second portion of the hash value.

11. The method of claim 10, further comprises storing, in the routing table, prefixes, of the set of prefixes, in a compressed form, and wherein calculating the respective hash value for each of the prefixes comprises calculating the respective value based on a corresponding prefix compressed according to the compressed form.

12. The method of claim 6, wherein the first Bloom filter includes a first Bloom filter block that represents a first subset of the set of prefixes represented by the first Bloom filter and a second Bloom filter block that represents a second subset of prefixes represented by the first Bloom filter, and wherein removing one or more Bloom filter blocks from the first Bloom filter includes:
    performing a logic OR operation based on contents of the first Bloom filter block and contents of the second Bloom filter block;
    configuring the first Bloom filter block based on the logic OR operation; and
    removing the second Bloom filter block.

13. An apparatus, comprising:
    a packet processor configured to perform processing of packets, received by a network device, at least to determine forwarding decisions for the packets;
    a memory for storing a routing table used for forwarding packets in a by the network device; and
    a search engine comprising a plurality of bloom filters configured to represent respective sets of prefixes of particular lengths in the routing table, the search engine configured to:
        receive a network address associated with a packet, wherein the network address is provided by the packet processor configured to perform processing of the packet;
        apply respective Bloom filters of the plurality of Bloom filters to respective prefixes of the network address to determine a set of one or more prefixes, of the network address, for which a match potentially exists in the routing table;
        perform a number of accesses to the memory using prefixes in the set of prefixes, beginning with a longest prefix in the set of prefixes and continuing in decreasing order of prefix length in the set of prefixes until an entry having a matching prefix is found in the routing table;
        retrieve, from the matching entry in the routing table, routing information for the packet;
        determine that the number of performed memory accesses exceeds a threshold; and
        in response to determining that the number of performed memory accesses exceeds the threshold,
            generate a feedback signal indicating that the number of performed memory accesses based on the network address exceeds the threshold,
            provide the feedback signal to the packet processor configured to perform processing of the packet,
            in response to providing the feedback signal to the packet processor, receive, from the packet processor, an instruction to adapt the routing table to the network address, and
        in response to receiving the instruction from the packet processor, adapt-the routing table in the memory to the network address to reduce a number of memory accesses to be performed for subsequent packets associated with the network address.

14. The apparatus of claim 13, wherein a first Bloom filter of the plurality of Bloom filters is configured to represent prefixes of a first length in the routing table, and wherein the first Bloom filter includes:
    a first Bloom filter block that represents a first subset of prefixes of the first length in the routing table; and
    a second Bloom filter block that represents a second subset of prefixes of the first length in the routing table;
    wherein the first subset of prefixes does not overlap with the second subset of prefixes.

15. The apparatus of claim 14, wherein the search engine further comprises a hash function engine configured to calculate a hash value based on a prefix of the first length, and wherein the search engine is further configured to use a first portion of the hash value to select the first Bloom filter block or the second Bloom filter block; and use a second portion of the hash value to select a location in the selected one of the first Bloom filter block and the second Bloom filter block; and determine whether a match in the routing table potentially exists in the routing table based on the location.

16. The apparatus of claim 13, wherein the search engine is configured to adapt the routing table at least by inserting a new entry into the routing table, wherein the new entry (i) is associated with a prefix of the network address, wherein the prefix is longer than the longest prefix match found in the routing table in the memory and (ii) includes the routing information retrieved from the routing table in the memory.

17. The apparatus of claim 13, wherein adapting the routing table is performed in a data plane of the network device.

18. The apparatus of claim 13, wherein:
the plurality of Bloom filters includes a first Bloom filter having at least one Bloom filter block configured to represent the set of prefixes represented by the first Bloom filter; and
wherein the search engine further comprises a dynamic bloom filter controller configured to
determine, based on one or more factors associated with the first Bloom filter, that one of (i) the size of the first Bloom filter should be increased or (ii) the size of the first Bloom filter should be decreased; and
in response to determining that the size of the first Bloom filter should be increased, add one or more additional Bloom filter blocks to the first Bloom filter; and
in response to determining that the size of the first Bloom filter should be decreased, remove one or more Bloom filter blocks from the first Bloom filter.

19. The apparatus of claim 18, wherein the dynamic Bloom filter controller is configured to add the one or more additional Bloom filter blocks to the first Bloom filter without interrupting operation of the first Bloom filter.

20. The apparatus of claim 18, wherein the dynamic Bloom filter controller is further configured to:
determine a false positive probability for the first Bloom filter; and
determine that the size of the first Bloom filter should be increased when the false positive probability exceeds a first threshold; and
determine that the size of the first Bloom filter should be decreased when the false positive probability falls below a second threshold.

21. The apparatus of claim 18, wherein the first Bloom filter includes a first Bloom filter block and wherein the dynamic Bloom filter controller is configured to, in response to determining that the size of the first Bloom filter should be increased:
add a second Bloom filter block to the first Bloom filter; and
configure the first Bloom filter block to represent a first subset of the set of prefixes in the routing table represented by the first Bloom filter, and
configure the second Bloom filter block to represent a second subset of prefixes in the set of prefixes represented by the first Bloom filter.

22. The apparatus of claim 21, wherein the dynamic Bloom filter controller is further configured to:
copy contents of the first Bloom filter block to the second Bloom filter block;
obtain a respective hash value for each of the prefixes in the set of prefixes, the hash value having a first portion and a second portion; and
for each prefix in the set of prefixes,
use the first portion of the hash value calculated for the prefix to determine to which whether the prefix belongs to the first subset of the set of prefixes or to the second subset of the set of prefixes; and
if it is determined that the prefix belongs to the first subset, set a location, in the second Bloom filter block, to a value that indicates that the prefix does not belong to the second subset, wherein the location is indicated by the second portion of the hash value; and
if it is determined that the prefix belongs to the second subset, set a location, in the first Bloom filter block, to a value that indicates that the prefix does not belong to the first subset, wherein the location is indicated by the second portion of the hash value.

23. The apparatus of claim 22, wherein the memory is configured to store prefixes, of the set of prefixes, in a compressed form, and wherein the respective hash value for each of the prefixes is calculated based on a corresponding prefix compressed according to the compressed form.

24. The apparatus of claim 18, wherein the first Bloom filter includes a first Bloom filter block that represents a first subset of the set of prefixes represented by the first Bloom filter and a second Bloom filter block that represents a second subset of prefixes represented by the first Bloom filter, and wherein the dynamic Bloom filter controller is configured to, in response to determining that the size of the first Bloom filter should be decreased:
obtain results of a logic OR operation performed based on contents of the first Bloom filter block and contents of the second Bloom filter block;
configure the first Bloom filter block based on the logic OR operation; and
remove the second Bloom filter block.

* * * * *